US012775163B2

(12) United States Patent
Craen et al.

(10) Patent No.: US 12,775,163 B2
(45) Date of Patent: Oct. 27, 2026

(54) CONTROLLABLE LIGHT DEFLECTION DEVICE WITH REDUCED ABERRATION

(71) Applicant: poLight ASA, Skoppum (NO)

(72) Inventors: Pierre Craen, Embourg (BE); Alain Gillet, Galan (FR); Nicolas Tallaron, Neuville sur Saône (FR)

(73) Assignee: poLight ASA, Tønsberg (NO)

( * ) Notice: Subject to any disclaimer, the term of this patent is extended or adjusted under 35 U.S.C. 154(b) by 260 days.

(21) Appl. No.: 18/570,059

(22) PCT Filed: Jun. 14, 2022

(86) PCT No.: PCT/EP2022/066157
§ 371 (c)(1),
(2) Date: Dec. 13, 2023

(87) PCT Pub. No.: WO2022/263439
PCT Pub. Date: Dec. 22, 2022

(65) Prior Publication Data

US 2024/0280806 A1 Aug. 22, 2024

(30) Foreign Application Priority Data

Jun. 14, 2021 (EP) .................................... 21179206

(51) Int. Cl.
*G02B 26/08* (2006.01)
*G02B 27/00* (2006.01)

(52) U.S. Cl.
CPC ..... *G02B 27/0031* (2013.01); *G02B 26/0816* (2013.01); *G02B 26/0891* (2013.01)

(58) Field of Classification Search
CPC combination set(s) only.
See application file for complete search history.

(56) References Cited

U.S. PATENT DOCUMENTS 3,565,514 A * 2/1971 Bate et al. ............. G02B 26/02 359/857
2020/0355910 A1 11/2020 Smolka et al.
2021/0341728 A1* 11/2021 Kartashov ............ G02B 27/646

FOREIGN PATENT DOCUMENTS

KR 101960192 B1 3/2019
WO 2020074711 A1 4/2020

OTHER PUBLICATIONS

International Search Report as issued by the European Patent Office in connection with International Application No. PCT/EP2022/066157.

(Continued)

*Primary Examiner* — Euncha P Cherry
(74) *Attorney, Agent, or Firm* — Ice Miller LLP; Justin Swindells

(57) ABSTRACT

The invention relates to a variable light deflection device comprising a prism, a reflection member arranged opposite to one of the faces of the prism for deflecting an incident refracted light ray back into the prism through said face as a deflected light ray, a refraction member arranged opposite another face of the prism for refracting the deflected light ray transmitted through said other face into a refracted output light ray, first and second transparent, shape variable bodies arranged between prism faces and the reflection and refraction members, first and second actuator systems arranged to tilt the reflection member to change a first propagation deviation angle of the refracted output light ray in a first output plane, and where the second actuator system is arranged to tilt the refraction member to change the same first propagation deviation angle of the refracted output light ray in said first output plane.

14 Claims, 13 Drawing Sheets

(56) References Cited

OTHER PUBLICATIONS

English Translation of KR 101960192 B1 cited herein.

* cited by examiner

| | 2D Tilted prism | | 2D POIS | | 2D Wedge | | 1D POIS + 2D Wedge | |
|---|---|---|---|---|---|---|---|---|
| OIS accuracy [µm] | z-dir 97 | x-dir 122 | z-dir 54 | x-dir 95 | z-dir 33 | x-dir 38 | z-dir 39 | x-dir 0 |
| Chromatic aberration [µm] | 0 | | 8 | | 16 | | 15 | |
| Distortion [%] | 0 | | 0.5 | | 1.3 | | 0.9 | |
| Stroke [µm] | 222/314 | | 133/157 | | 567/567 | | POIS z/h= 222/ 0 | Wedge z/x= 314/ 571 |
| Image rotation [º] | 3 | | 2 | | 0.005 | | 0.05 | |

| | 2x 1D Tilted prism | | 2x 1D POIS | | 2x 1D POIS + 2D Wedge | |
|---|---|---|---|---|---|---|
| OIS accuracy [μm] | z-dir 5 | x-dir 7 | z-dir 15 | x-dir 11 | z-dir 6 | x-dir 8 |
| Chromatic aberration [μm] | 0 | | 8 | | 1 | |
| Distortion [%] | 0 | | 0.5 | | 0.002 | |
| Stroke [μm] | 222 / 222 | | 133 / 133 | | 2x 1D POIS 222 / 222 | 2D Wedge y/z = 314 /314 |
| Image rotation [º] | 0.1 | | 0.16 | | 0.1 | |

| | 2x 2D Tilted prism | | 2x 2D POIS + 2D Wedge | | |
|---|---|---|---|---|---|
| OIS accuracy [µm] | z-dir 0 | x-dir 0 | z-dir 0 | x-dir 0 | |
| Chromatic aberration [µm] | 0 | | 0 | | |
| Distortion [%] | 0 | | 0.008 | | |
| Stroke [µm] | Prism 1 216 / 7 | Prism 2 8 / 228 | POIS 1 228 / 5 | POIS 2 5 / 228 | 2D Wedge 311 / 322 |
| Image rotation [º] | 0 | | 0 | | |

| Parameters | 2D-POIS | | Achromatic 2D-POIS device 790 | | Achromatic 2D-POIS device 791 | |
|---|---|---|---|---|---|---|
| OIS accuracy [μm] | z-dir 54 | x-dir 95 | z-dir 82 | x-dir 97 | z-dir 91 | x-dir 115 |
| Lateral color [μm] | 8 | | 2.8 | | 0.1 | |
| Geometric distortion [%] | 0.5 | | 0.4 | | 0.18 | |
| Image rotation [°] | 2 | | 2 | | 2.5 | |
| Stroke [μm] | 133 / 157 | | 151 / 146 | | Reflector : 199 / 198<br>Refractor : 153 / 106 | |

CONTROLLABLE LIGHT DEFLECTION DEVICE WITH REDUCED ABERRATION

CROSS-REFERENCE TO RELATED APPLICATIONS

This application is a National Stage of International Application No. PCT/EP2022/066157, filed on Jun. 14, 2022, which was published in the English language on Dec. 22, 2022, under International Publication No. WO 2022/263439 A1, which claims priority to European Patent Application No. 21179206.4, filed on Jun. 14, 2021, the disclosures of which are incorporated herein by reference in their entireties.

FIELD OF THE INVENTION

The invention relates to a light deflection devices, such as prismatic deflection devices, to designs aiming at reducing aberrations and distortions, to camera systems incorporating such light deflection devices, particularly camera systems wherein the controllable deflection properties are used to achieve optical image stabilization.

BACKGROUND OF THE INVENTION

Optical image stabilization is used to compensate unintended motion of the camera in order to obtain improved image sharpness. Known methods include controlled movement of lenses of the imaging system or controlled movement of the image sensor.

While such known solutions may be suitable in traditional cameras, the inventors have found that improved solutions are of benefit for compact cameras, such as cameras in smart phones.

Image quality is of great importance and therefore the solution for optical image stabilization should still be able to provide acceptable levels of image aberrations.

In an attempt to solve such problems and other problems, the inventors has devised the present invention.

SUMMARY OF THE INVENTION

It is an object of the invention to provide a solution for optical image stabilization suitable for compact cameras. Particularly, it is an object to provide a solution with improved imaging quality in terms of improved image aberration characteristics including low image distortion and low chromatic aberration. Furthermore, it is an object to achieve reduced image distortion and reduced chromatic aberration for large image stabilization corrections.

In a first aspect of the invention there is provided a variable light deflection device comprising,

- a prism with at least first, second and third faces, wherein the first face is for refracting an incident light ray into an incident refracted light ray,
- a reflection member arranged opposite to the second face for deflecting the incident refracted light ray back into the prism through the second face as a deflected light ray,
- a refraction member arranged opposite to the third face for refracting the deflected light ray transmitted through the third face into a refracted output light ray,
- first and second transparent, shape variable bodies arranged between the second and third faces and the respective reflection and refraction members,
- first and second actuator systems where the first actuator system is arranged to tilt the reflection member to change a first propagation deviation angle of the refracted output light ray in a first output plane, and where the second actuator system is arranged to tilt the refraction member to change the first propagation deviation angle of the refracted output light ray in said first output plane.

Advantageously, the tilted reflection member and refraction member and the non-fluid bodies connecting the prism with the reflection and refraction members provides improved aberration characteristics of the variable light deflection device suited which can be used in an optical image stabilization system.

Particularly, when there is a need for large image stabilization corrections, large tilt angles would be required, for example tilt angles larger than 1 degree, such as tilt angles up to 10 degrees. Such significant tilt angles would in normal single tilt configurations normally generate significant image distortion and chromatic aberration, but in the present configuration with two independent tilt adjustment means arranged to independently adjust the same propagation deviation angle in the output plane it is possible to minimize image distortion and chromatic aberration.

The first and second actuator systems are arranged to change the tilt of the reflection and refraction members independent of each other. That is, the tilt angle at of the reflection member and the tilt angle a2 of the refraction member, both defined in the output plane, can be adjusted independently.

WO 2020/074711A1 discloses an optical assembly for use with compact camera modules. The optical assembly comprises an optical reflection surface arranged to deflect a light through the optical element, a transparent elastic non-fluid body and an actuator system comprising one or more actuators and an actuator-component arranged to undergo bending and/or displacement by the one or more actuators. The orientation of the actuator component can be changed by actuation of the actuators to provide adjustable optical power or beam deflection.

Whereas WO2020/074711A1 also discloses a beam deflector, WO2020/074711A1 does not disclose first and second actuator systems which are both arranged to control tilt of two deflection means such as the deflection and refraction members.

However, in spite of the increased complexity of controlling two independent tilt systems, the two controllable tilt systems enables reduction of image aberrations such as image distortion and chromatic aberration.

According to an embodiment, the reflection member is arranged with a first acute angle at to the second face and the refraction member is arranged with a second acute angle a2 to the third face, wherein the variable light deflection device further comprises a control system arranged to control the tilt provided by the first and second actuator systems according to a predetermined mathematical expression for the first and second acute angles at and a2.

Advantageously, the reflection and refraction members can be controlled to adjust the first and second acute angles at and a2 according to predetermined mathematical expression, such as according to equations for a1 and a2, so that the image distortion and/or chromatic aberration is reduced and also to achieve optical image stabilization by controlling variations in the first and second acute angles at and a2 according to equations which depend on the jitter angle.

According to an embodiment, the predetermined mathematical expression is dependent on a jitter angle, where the jitter angle is an angle of incidence of an axial chief ray at the first face, wherein the axial chief ray is an incident ray connecting an object point and a centre of an entrance pupil of an imaging system located downstream of the third face, wherein the object point, in a situation with zero jitter, is located on an optical axis in object space.

Alternatively, but equivalently, the jitter angle can be defined on basis of an axial chief ray of the imaging system, i.e. an imaging system that would be placed downstream of the prism. The axial chief ray is a reference ray that connects an on-axis object point and the centre of the entrance pupil of the imaging system.

As jitter is introduced, either due to rotation or translation of the electronic device containing the variable light deflection device or translation of the object, the on-axis object becomes off axis and the angle of the axial chief ray relative to the optical axis changes according to the jitter. The axis where the on-axis object is located is the optical axis of the imaging system in the object space where is folded by the prism. Thus, on basis of this reference axial chief ray, the jitter angle can be defined as the angle between the axial chief ray and the normal vector to the first face or entrance face of the prism.

In general, the jitter angle βi describes a deviation of the angle of incidence of the incident light ray relative to a reference angle of incidence.

The jitter angle, such as jitter angle rotations, may be measured e.g. by accelerometers or gyros and by determining rotation of the electronic device which houses the variable light deflection device dependent on the acceleration measurements. The rotations of the electronic device are equivalent to the deviation or change of the angle of incidence of the incident light ray relative to a reference angle of incidence. Jitter angle translations, e.g. due to a moving object, may be determined by use of a processor comprised by the electronic device and an algorithm arranged to be executed by the processor, wherein the algorithm is arranged to determined jitter translation e.g. by tracking features, i.e. pixel tracking, in the digital image from the image sensor. The determined jitter translation can be converted to a corresponding jitter angle for controlling the tilt angles of the reflection and refraction members.

According to an embodiment, the predetermined mathematical expression is further dependent on two or more Abbe numbers V1, V2, V3 and/or two or more refractive indices n1, n2, n3 of the respective prism and the first and second transparent, shape variable bodies.

That is, for the general case where the refractive indices n1, n2, n3 of both the shape variable bodies and the prism are different the predetermined mathematical expression for the first and second acute angles a1, a2 can be determined based on the expressions:

$$a1 = \frac{-\beta i}{2\left[(2n2 - n1) - V3\left[2\frac{(n2-1)}{V2} - \frac{(n1-1)}{V1}\right]\right]}$$

$$\alpha 2 = \frac{-\beta i\, V3\left[2\frac{(n2-1)}{V2} - \frac{(n1-1)}{V1}\right]}{(n3-1)\left[(2n2 - n1) - V3\left[2\frac{(n2-1)}{V2} - \frac{(n1-1)}{V1}\right]\right]}$$

It is understood that the first and second acute angles a1, a2 need not be exactly equal to the expressions, but may deviate therefrom, and may be determined based on the above expressions, e.g. based on an optimization algorithm when other conditions also has to be met.

In the configuration where only the refractive indices n1 and n3 of the second shape variable body and the prism are different the predetermined mathematical expression for the first and second acute angles a1, a2 can be determined based on the expressions:

$$a1 = \frac{\beta i}{2\left[(n1-1)\frac{V3}{V1} - n1\right]}$$

$$a2 = \frac{\beta i(n1-1)}{(n3-1)\left[(n1-1) - \frac{V1}{V3}n1\right]}$$

where "based on" implies that deviations from the exact equations are acceptable within ranges such as deviations of up to +/−30 percent from the ideal mathematical expressions.

Advantageously, by configuring the prism and one or both of the shape variable bodies with different refractive indices and Abbe numbers, the chromatic aberration may be further reduced.

According to an embodiment, the predetermined mathematical expression specifies that a ratio between the second acute angle a2 and the first acute angle at is constant or substantially constant for different values of the first and second acute angles.

Advantageously, for a variable light deflection device where refractive indices of the shape variable bodies and the prism are equal or substantially equal, the image distortion and chromatic aberration can be reduced with a ratio of two and image stabilization can be achieved at the same time by adjusting the tilt angles a1, a2 subject to the constraint of the ratio of the tilt angles.

According to an embodiment, the constant or substantially constant ratio between the second acute angle a2 and the first acute angle at is dependent on the two or more Abbe numbers and/or the two or more refractive indices of the respective prism and the first and second transparent, shape variable bodies.

Thus, two or all of the first and second transparent, shape variable bodies and the prism have different refractive indices and/or different Abbe numbers.

That is, for the general case where the refractive indices n1, n2, n3 of both the shape variable bodies and the prism are different the constant or substantially constant ratio between the second acute angle a2 and the first acute angle at is given by:

$$a2/a1 = 2\frac{V3}{(n3-1)}\left[2\frac{(n2-1)}{V2} - \frac{(n1-1)}{V1}\right]$$

In the configuration where only the refractive indices n1 and n3 of the prism and the second shape variable body are different the constant or substantially constant ratio between the second acute angle a2 and the first acute angle a1 is given by:

$$a2/a1 = 2\frac{(n1-1)}{(n3-1)}\frac{V3}{V1}$$

Again, the ratio between the second acute angle a2 and the first acute angle at need only be based on the above equations and may therefore deviate from the exact equations, such as deviations of up to +/−30 percent from the ideal mathematical expressions.

Advantageously, for a variable light deflection device where refractive indices of the shape variable bodies and the prism are not all equal, the image distortion and chromatic aberration can also be reduced when the ratio specified by the predetermined mathematical expressions is met, and image stabilization can be achieved at the same time by adjusting the tilt angles a1, a2 according to predetermined equations for the tilt angles a1, a2.

The prism may be a triangular prism, or a prism composed of connected triangular prisms or which has the shape of connected triangular prisms, such as two connected triangular prisms.

The refraction member is located downstream of the reflection member, i.e. so that the incident light is reflected by the reflection member before being refracted out via the refraction member.

The reflection member is arranged with a first acute angle at to the second face and the refraction member is arranged with a second acute angle a2 to the third face, wherein the tilt provided by the first and second actuator systems is controllable so that a ratio between the second acute angle a2 and the first acute angle at is constant or substantially constant for different tilt values.

The actuator systems control the tilt values, i.e. changes the tilt values to compensate jitter, but subject to the constraint that the ratio $a2/a1$ is constant or substantially constant, where the constant may depend on the refractive indices and Abbe numbers of the prism and shape variable bodies.

The variable light deflection device further comprises a control system arranged to control the first and second acute angles.

In an embodiment, the first transparent, shape variable body and the prism have different refractive indices n2, n1, and Abbe numbers V2, V1, respectively, and the different refractive indices n2, n1 and Abbe numbers V2, V1 of the first transparent, shape variable body and the prism, respectively, are based on a condition, $V2=2V1(n2-1)/(n1-1)$.

In an example, the second transparent, shape variable body and the prism have different refractive indices n3, n1 and different Abbe numbers V3, V1. In this example, the constant or substantially constant ratio between the second acute angle a2 and the first acute angle at is given by $a2/a1=2(n1-1)/(n3-1)*V3/V1$. The condition $a2/a1=2(n1-1)/(n3-1)*V3/V1$, when satisfied or partly satisfied, results in low chromatic aberration when the second transparent, shape variable body and the prism have different refractive indices n3, n1. By further controlling the tilt angles a1, a2 dependent on the incident angle βi according to the equations $a1=\mu i/2[(n1-1)V3/V1-n1]$ and $a2=Pi(n1-1)/(n3-1)[(n1-1)-V1/V3\,n1]$ the resulting change of direction of the output beam due to the controlled tilt angles will compensate the jitter angle.

A second aspect of the invention relates to a variable light deflection device comprising,

- a prism with at least first, second and third faces, wherein the first face is for refracting an incident light ray into an incident refracted light ray,
- a reflection member arranged opposite to the second face for deflecting the incident refracted light ray back into the prism through the second face as a deflected light ray,
- a first transparent, shape variable body arranged between the second faces and the reflection members,
- a first actuator system arranged to tilt the reflection member to change a first propagation deviation angle of the refracted output light ray in a first output plane,
- wherein the first transparent, shape variable body and the prism have different refractive indices n2, n1, and Abbe numbers V2, V1, respectively, and wherein the different refractive indices n2, n1 and Abbe numbers V2, V1 of the first transparent, shape variable body and the prism, respectively, are based on a condition, $V2=2V1(n2-1)/(n1-1)$.

The different refractive indices and Abbe number of the prism and the first transparent, shape variable body result in low chromatic aberration when the condition $V2=2V1(n2-1)/(n1-1)$ is satisfied, or when refractive indices and Abbe numbers are selected based on minimizing the difference $\Delta=V2-2V1(n2-1)/(n1-1)$.

Similarly to the second aspect, a variable light deflection device is obtained by:

- providing a prism with at least first, second and third faces, wherein the first face is for refracting an incident light ray into an incident refracted light ray,
- providing a reflection member arranged opposite to the second face for deflecting the incident refracted light ray back into the prism through the second face as a deflected light ray,
- providing a first transparent, shape variable body arranged between the second faces and the reflection members,
- providing a first actuator system arranged to tilt the reflection member to change a first propagation deviation angle of the refracted output light ray in a first output plane,
- wherein providing the prism and the first transparent, shape variable body comprises determining a refractive index n1 and an Abbe number V1 of the prism based on a condition $V2=2V1(n2-1)/(n1-1)$, so that the prism and the first transparent, shape variable body have different refractive indices n2, n1 and Abbe numbers V2, V1, respectively.

Further, similar to the second aspect, a method for manufacturing variable light deflection device is provided, the method comprises

- providing a prism with at least first, second and third faces, wherein the first face is for refracting an incident light ray into an incident refracted light ray,
- providing a reflection member arranged opposite to the second face for deflecting the incident refracted light ray back into the prism through the second face as a deflected light ray,
- providing a first transparent, shape variable body arranged between the second faces and the reflection members,
- providing a first actuator system arranged to tilt the reflection member to change a first propagation deviation angle of the refracted output light ray in a first output plane,
- wherein providing the prism and the first transparent, shape variable body comprises determining the refractive index n1 and Abbe number V1 of the prism based on a condition $V2=2V1(n2-1)/(n1-1)$, so that the prism and the first transparent, shape variable body (241) have different refractive indices n2, n1 and Abbe numbers V2, V1, respectively.

According to an embodiment, the variable light deflection device comprises a deflection means arranged to change a second propagation deviation angle of the refracted output light ray in a second output plane being perpendicular or substantially perpendicular to the first output plane.

Thereby, the system is able to compensate jitter in two dimensions. According to an embodiment, the deflection means comprises the first or the second actuator system arranged to further tilt the reflection member or the refraction member to change the second propagation deviation angle of the refracted output light ray in the second output plane.

Accordingly, the second actuator system is arranged to generate a tilt of the refraction member about two perpendicular or substantially perpendicular axes.

According to an embodiment, the deflection means comprises a further reflection member arranged for deflecting the deflected light ray into a further deflected light ray to change the second propagation deviation angle of the refracted output light ray in the second output plane.

Advantageously, an additional reflection member, controlled independently from the first reflection member, provides deflection on the light ray in a direction different, such as perpendicular, to the deflection direction provided by the first reflection member.

The further refraction member may be located downstream of the reflection member and upstream of the refraction member. The first and/or the second output planes may be arranged perpendicular or substantially perpendicular to the third face.

According to an embodiment, the prism comprises

- a fourth face, wherein the further reflection member is arranged opposite to the fourth face for deflecting the deflected light ray into a further deflected light ray, and arranged so that the refraction member is arranged for refracting the further deflected light ray,
- a third transparent, shape variable body arranged between the fourth face and the further reflection member, and
- a third actuator system arranged to tilt the further reflection member to change the second propagation deviation angle of the refracted output light ray in the second output plane being perpendicular to the first output plane.

The further reflection member is arranged with a third acute angle to the fourth face. The third actuator system is arranged to change the third acute angle to achieve the change of the second propagation deviation angle of the refracted output light ray.

According to an embodiment, the variable light deflection device further comprises at least one tilt sensor arranged to measure the tilt of any of the reflection member, the further reflection member and the refraction member.

According to an embodiment, the first and/or the second transparent, shape variable bodies are first and second transparent, deformable, non-fluid bodies, wherein the prism comprises a same deformable, non-fluid material as the first and second transparent, deformable, non-fluid bodies, so that at least one of the second and third faces of the prism are formed in the non-fluid material.

Advantageously, by forming the prism and the first and/or the second shape variable bodies from the same deformable, non-fluid material, the different components have the same refractive indices.

A fifth aspect of the invention relates to a camera module comprising the optical variable light deflection device according to any of the first, second and third aspects and an image sensor.

The camera module according to the fifth aspect may comprise a processor for controlling the one or more actuator systems so as to carry out optical image stabilisation and/or image focusing.

A sixth aspect of the invention relates to an electronic device comprising a camera module according to the fifth aspect. The electronic device may be any one of a telephone, such as a smartphone, a watch, such as a smartwatch, a tablet, a laptop, a camera, or other device.

A seventh aspect of the invention relates to the use of an electronic device according to the sixth aspect for obtaining images.

In summary the invention relates to a variable light deflection device comprising a prism, a reflection member arranged opposite to one of the faces of the prism for deflecting an incident refracted light ray back into the prism through said face as a deflected light ray, a refraction member arranged opposite another face of the prism for refracting the deflected light ray transmitted through said other face into a refracted output light ray, first and second transparent, shape variable bodies arranged between prism faces and the reflection and refraction members, first and second actuator systems arranged to tilt the reflection member to change a first propagation deviation angle of the refracted output light ray in a first output plane, and where the second actuator system is arranged to tilt the refraction member to change the same first propagation deviation angle of the refracted output light ray in said first output plane.

In general, the various aspects and embodiments of the invention may be combined and coupled in any way possible within the scope of the invention.

These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DETAILED DESCRIPTION OF EMBODIMENTS

Figure 1A:
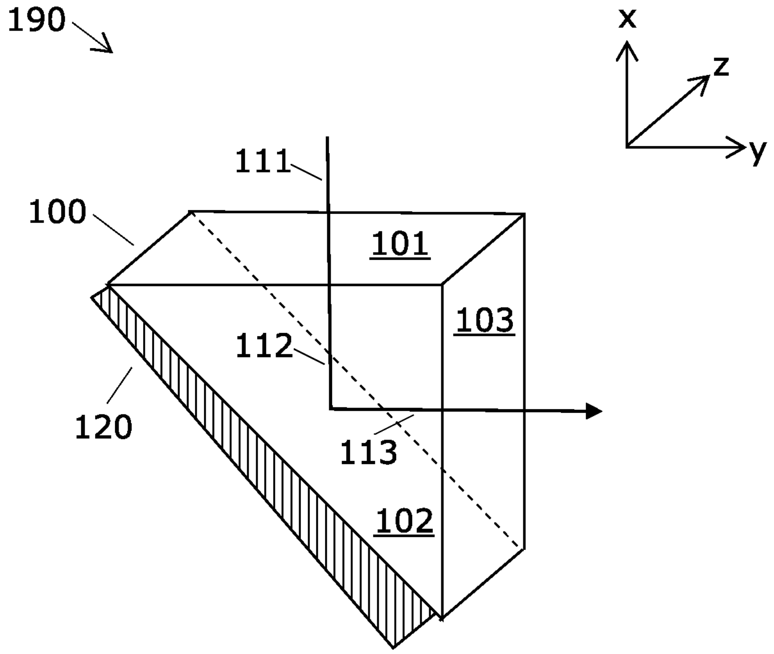
FIG. 1A shows a variable light deflection device.

FIG. 1A shows a variable light deflection device 190 arranged for deflecting an incoming light ray 111 by controlling the tilt of a reflection member 120 such as a mirror. The ray 111 is refracted through the first face 101 of the prism 100, refracted through the second face 102 and reflected back to the second face 102 and then refracted out of the prism 100 via the third face 103. By means of the controllable mirror tilt, the propagation angle of the refracted output light ray in a first output plane (xy plane) and possibly in a second perpendicular output plane (xz plane) can be controlled such as to compensate unintended camera jitter by controlling the tilt of a reflection member 120 and thereby achieving optical image stabilization in a camera. The output planes may be defined relative to the plane of incidence of the incoming light ray 111, e.g. the first output plane may be defined by, or relative to, the plane of incidence. Alternatively, the output planes may be defined as perpendicular planes to the third face or planes in the reference coordinate system. In general, the output planes are stationary planes.

Not only camera jitter, but also motion or jitter of the object can be compensated. Thus, the variable light deflection device can be controlled to compensate motion of an object, i.e. the variable light deflection device can be controlled so that the imaged objected is stationary on the image sensor.

An example of the light deflection device 190 and use for optical image stabilization is described in WO 2020/074711 A1 hereby incorporated by reference.

Figure 1B:
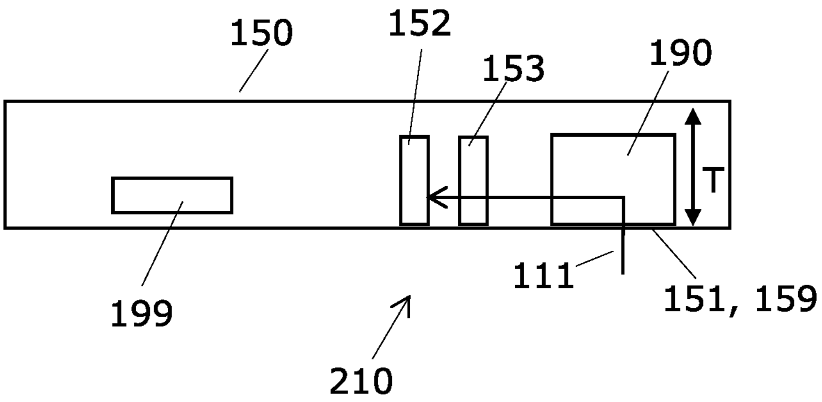
FIG. 1B shows a cross-sectional view of an electronic device comprising a camera module.

FIG. 1B shows a cross-sectional view of an electronic device 150 comprising a camera module 210. The electronic device 150 may be telephone, such as a smartphone, a watch, such as a smartwatch, a tablet, a laptop, a camera or other electronic device.

The electronic device 150 comprises the light deflection device 190 which may be arranged to receive light via an aperture 151. The aperture 151 may comprise a window such as a transparent plate. The light deflection device 190 folds, e.g. by a 90 degrees deflection, the incident light rays of the received light into a propagation direction, e.g. a propagation direction which allows the deflected light to propagate along an elongate direction of the electronic device. The elongate length of the device electronic device 150 may be significantly longer than the thickness T of the device, where the thickness extends in a direction perpendicular or substantially perpendicular to a plane of the aperture 220.

The aperture 151 may be comprised by a transparent cover member arranged to transmit light towards the optical variable light deflection device.

The deflection device 190 may form part of a camera module 210 which may further comprise an image sensor 152 arranged to receive the deflected light and optionally lenses 153 or other optical components arranged in the pathway of the deflected light. The camera module 210 may further comprise variable lenses with a controllable optical power such as described in WO 2020/074711 A1.

The camera module 210 or electronic device 150 may further comprise a control system 199 comprising a processor for controlling an actuator system arranged to tilt the reflection member 120 or a refraction member to be described below.

While FIGS. 1A-1B illustrate the principle of optical image stabilization the inventors have realized that the design in FIG. 1A can be improved to achieve reductions of distortions (optical aberration) and chromatic aberration. By distortion is meant that the variations of propagation directions of the input beam and the output beam are different.

Figure 2:
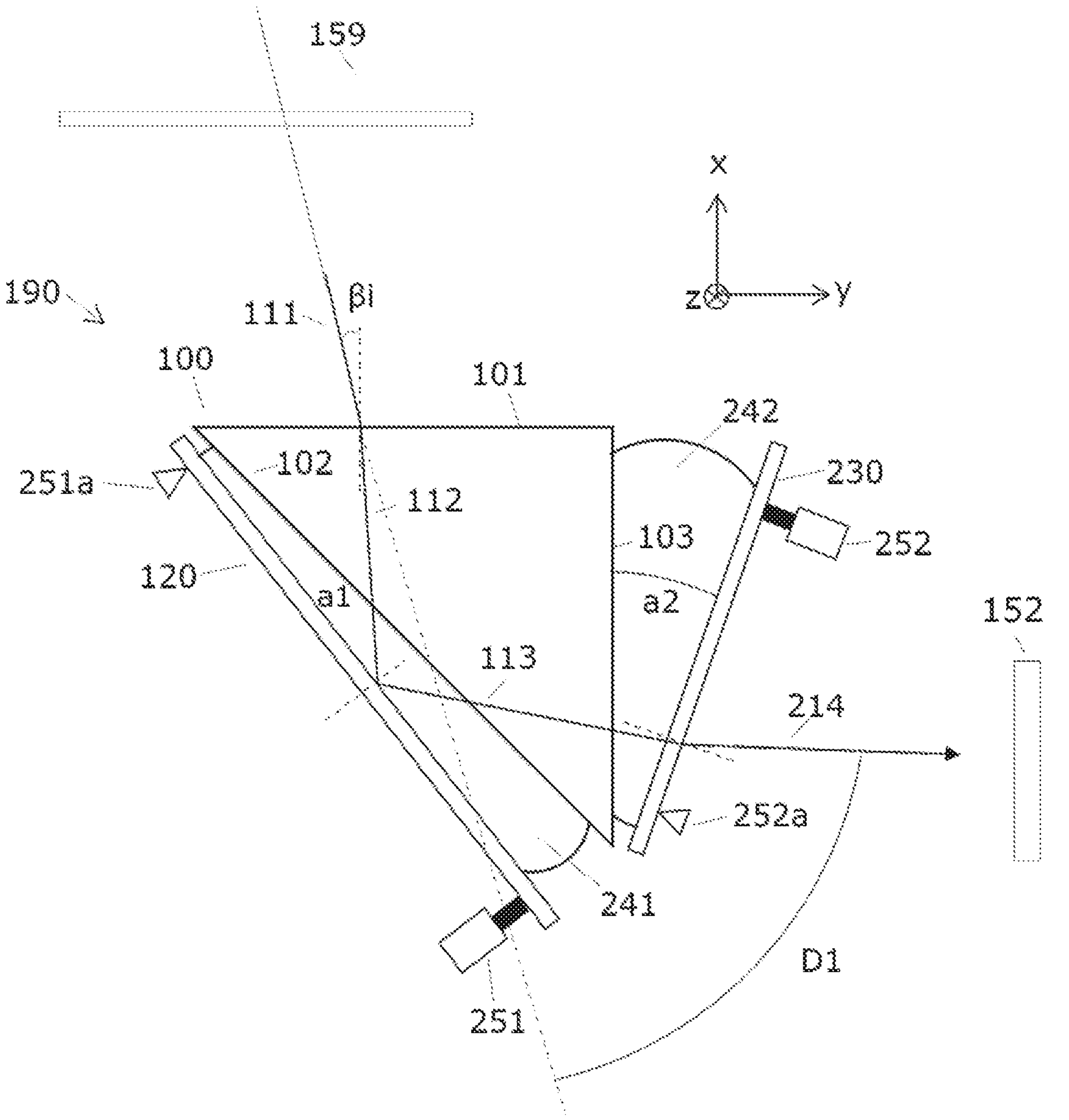
FIG. 2 shows an embodiment of the variable light deflection device providing reduced distortion and chromatic aberration as well as improved accuracy of optical image stabilization.

FIG. 2 shows an embodiment of the variable light deflection device 190 providing reduced distortion and chromatic aberration as well as improved accuracy.

In general the prism 100 has at least first, second and third faces 101, 102, 103, wherein the first face is for refracting an incident light ray 111 into an incident refracted light ray 112. The faces 101, 102, 103 are plane faces.

The prism 100 may be a triangular prism such as a right angled prism or have other geometric shapes. The prism may be assembled from two or more optical elements such as two or more connected triangular prisms 591, 592 (See FIG. 5). Alternatively, the prism 100 is monolithic, but has the shape of connected triangular prisms, such as two connected triangular prisms.

The reflection member 120 is arranged opposite to the second face 102 for deflecting the incident refracted light ray 112 back into the prism through the second face 102 as a deflected light ray 113.

The light deflection device 190 further comprises a refraction member 230 located downstream of the reflection member 120 and arranged opposite to the third face 103 for refracting the deflected light ray 113 transmitted through the third face into a refracted output light ray 214. Thus, the refracted output light ray 214 may propagate towards an image sensor 152 of the camera module 210.

First and second transparent, deformable, non-fluid bodies 241, 242 are sandwiched between the second and third faces 102, 103 and the respective reflection and refraction members 120, 230.

The transparent deformable, non-fluid bodies 241, 242 are preferably made from an elastic soft material. The non-fluid bodies 241, 242 may be made from a soft polymer, which may include a number of different materials, such as silicone, polymer gels, a polymer network of cross-linked or partly cross-linked polymers, and a miscible oil or combination of oils. The elastic modulus of the non-fluid body may be larger than 300 Pa, thereby avoiding deformation due to gravitational forces in normal operation. The refractive index of the non-fluid body may be larger than 1.3 or at least greater than the refractive index of air. The non-fluid bodies 241, 242 may have a refractive index which is equal, substantially equal or close to the refractive index of the prism 100 and the refraction member 230 to reduce reflections at the boundaries of the non-fluid bodies. As compared with fluidic shape variable bodies, the transparent, deformable non-fluid bodies may be elastically deformable, and may have a shear modulus greater than zero. As an alternative to transparent deformable, non-fluid bodies, any one or more of the bodies 241, 243, 543 may be fluidic bodies, i.e. shape variable bodies comprising a fluid such as a liquid like an oil or water based liquid which is contained within a flexible encapsulation. For example, the fluid may be encapsulated by a transparent flexible material, such as flexible foil.

Thus, in general the transparent bodies 241, 243, 543 are transparent shape variable bodies which may be embodied as transparent deformable, non-fluid bodies or transparent fluidic bodies, including that different transparent shape variable bodies may be configured by differently according to the two possibilities.

The examples and embodiments herein primarily refers to transparent deformable, non-fluid bodies, but could equally be based on shape variable fluidic bodies instead. Thus, examples and embodiments are not limited to bodies 241, 243, 543 made from deformable, non-fluid bodies, but also encompass solutions based on fluidic bodies, or in general shape variable bodies.

Due to the non-fluid bodies 241, 242, the refractive index from the first face 101 to the third face 103 is greater than the refractive index of air. Accordingly, the non-fluid bodies are optically connected with the faces of the prism and the reflection and refraction members.

One or more of the non-fluid bodies 241, 242, or shape variable bodies 241, 242, the prism 100, and the refraction member 230 may have the same refractive indices and Abbe numbers, or they may have different refractive indices and Abbe numbers, e.g. for the purpose of reducing chromatic aberration as described elsewhere.

For example, the equal refractive indices may be achieved if the prism 100 is made from the same non-fluid material as the one or more transparent deformable, non-fluid bodies 241, 242. For example, the prism may be made so that the second and third faces—or in general any prism face contacting any of the reflection and refraction members 120, 230, 520—is formed as a boundary face of the non-fluid material of the prism 100, or one or more of the non-fluid bodies 241, 242 is integrally formed with the non-fluid prism body. The first face 101 of the non-fluid prism body comprises a transparent member such as a glass plate.

The light deflection device 190 further comprises first and second actuator systems 251, 252. Each of the actuator systems may comprise one or more actuators. The actuator may be linear displacement actuators such as linear piezo-electric displacement actuators or motors. The reflection and refraction members 251, 252 may be hinged via hinge connections 251*a*, 252*a* so that the reflection and refraction members are rotated about the hinge connections in response to the linear actuator displacement.

The first actuator system 251 is arranged to tilt the reflection member to change a first propagation deviation angle D1 of the refracted output light ray 214 in a first output plane, here the xy plane. The first propagation deviation angle D1 is the angular difference between the directions of the incident ray 111 and the output ray 214. That is, the first propagation deviation angle D1 is defined by the output angle βo of the output ray 214 relative to the jitter angle βi of incident ray 111. Thus, the propagation deviation angle D1 is the angular difference between an incident ray 111 of a given angle of incidence and the resulting output ray.

The first propagation deviation angle D1, as well as the first propagation deviation angle D2 (see references to D2 below), may be defined in other ways, but in general so that the propagation deviation angle D1 is defined as an angle relating to the difference between the angle of the incident beam 111 and the angle of output beam 214 in a plane or a 3D space.

The purpose of defining the first and second propagation deviation angles D1, D2 is to achieve a solution wherein changes in the first and second propagation deviation angles D1, D2 resulting from changes in the jitter angle βi and the refractive index n or indices n1, n2 is minimized. Thus, the essence is to achieve a solution wherein the first and/or second propagation deviation angles D1, D2 are kept as close to constant as possible for changes in the jitter angle βi and the refractive index/indices to minimize image distortion and chromatic aberration. According to examples of the invention, such solutions are achieved by controlling the tilt angles of the reflection and refraction members in a specific way and/or by configuring the prism and the one or more shape variable bodies to have specific refractive indices.

Figure 13:
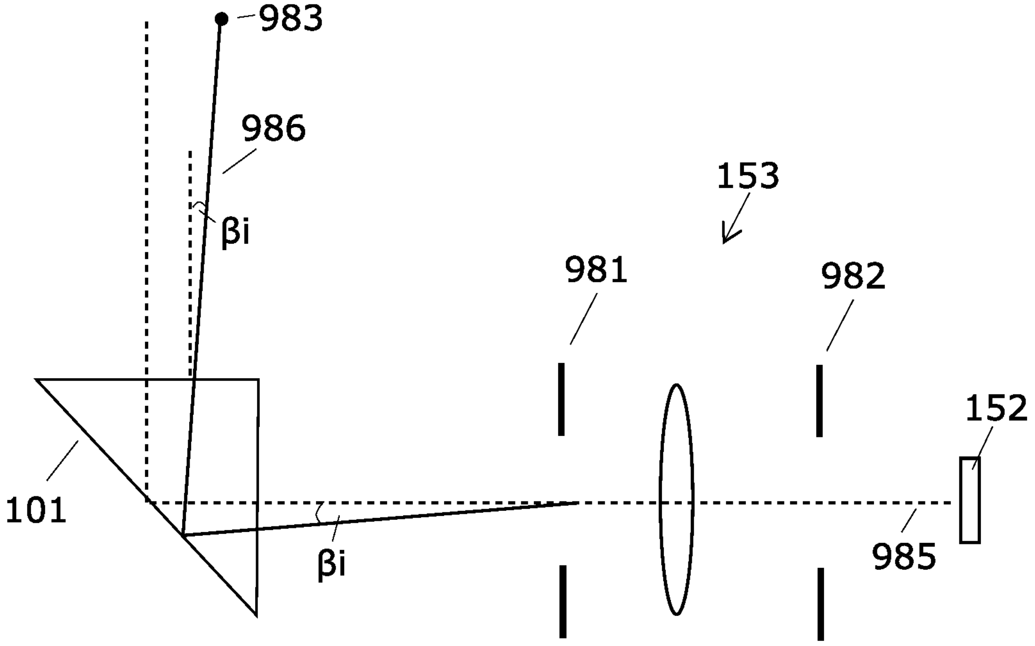
FIG. 13 is an illustration for defining the jitter angle.

FIG. 13 provides a definition of the jitter angle βi. Thus, the jitter angle βi is the angle of incidence of an axial chief ray 986 at the first face 101, i.e. the angle between the axial chief ray 986 and the normal to the first face 101 in the plane spanned by the axial chief ray 986 and the normal to the first face 101. Equivalently, the jitter angle βi is the angle between the axial chief ray 986 and the optical axis 985, either the folded optical axis in object space or the optical axis of the imaging system 153, i.e. an imaging system 153 comprising imaging lenses arranged to image the object 983 on the image sensor 152. The optical axis 985 is the optical axis defined by the lenses of the imaging system 153.

It is understood that the imaging system 153 need not be comprised by the variable light deflection device 190, but is used together with the light deflection device, e.g. in an electronic device 150 or other system.

The axial chief ray 986 is defined by a ray, e.g. the incident ray 111, connecting an object point 983 in object space upstream of the first face 101 and the centre of the entrance pupil 981 of the imaging system located downstream of the third face 103. The axial chief ray is folded by the prism 101.

The entrance pupil is the image of the aperture stop, e.g. the aperture stop 982, formed by the imaging lenses of the imaging system 153.

The object point 983 is defined as an object point which in a situation with zero jitter is located on the folded optical axis 985 in object space. Thus, the object point 983 is an on-axis object point in the sense that it is located on the optical axis 983 in a situation with zero jitter.

As jitter is introduced, either due to rotation or translation of the electronic device 150 or due to translation of the object point 983, e.g. due to imaging of a fast moving object, the on-axis object point 983 becomes off axis and the angle of the axial chief ray 986 relative to the optical axis, i.e. the angle of incidence of the axial chief ray 986, changes according to the jitter.

Thus, on basis of this reference axial chief ray 986, the jitter angle βi can be defined as the angle of incidence of the axial chief ray 986 relative to the first face 101.

Accordingly, as the electronic device comprising the variable light deflection device 190 is rotated or the object moves, the axial chief ray 986 will make an angle, i.e. angle of incidence, which is the jitter angle, while the angle of incidence of other incident rays will change correspondingly. The angle of incidence or jitter angle Bi is defined in the plane of incidence, i.e. the plane spanned by the surface normal to the first face 101 of the prism 101 and the propagation vector of the axial chief ray 986.

Alternatively or additionally, in a situation where jitter is only due to rotations of the electronic device 150, the jitter angle βi can be defined as the angle of incidence of a "reference incident ray". The reference incident ray is the incident ray 111 which in a situation with zero jitter is normal to the first face 101. Thus, in a situation with non-zero jitter, the reference incident ray makes an angle βi relative to the normal of the first face 101. Therefore, the angle βi which is the angle of incidence gives the jitter angle.

Herein, the jitter angle βi and the angle of incidence pi are used interchangeably.

The second actuator system 252 is arranged to tilt the refraction member 230 to change the first propagation deviation angle D1 of the refracted output light ray 214 in the same first output plane, here the xy plane.

As shown in FIG. 2, the reflection member 120 is arranged with a first acute angle at to the second face 102 and the refraction member 230 is arranged with a second acute angle a2 to the third face 103. As will be shown below with reference to FIG. 3, the image distorting and chromatic aberration can be reduced by controlling the angles a1, a2 so that a ratio between the second acute angle a2 and the first acute angle at is equal to two or substantially equal to two.

The first and second acute angles a1, a2, as well as the third and fourth acute angles a3, a4 define the angle between the reflection or refraction face, such as the planar faces thereof, of the reflection or refraction members and the related faces of the prism 101, 591, 592. Further, the acute angles are defined in planes which are perpendicular to the tilt or rotation axes of the reflection and refraction members or equivalently, in planes which are perpendicular to the reflection and refraction faces of the reflection and refraction members and perpendicular to opposite face of the prism independent of the tilt angle.

Figure 3A:
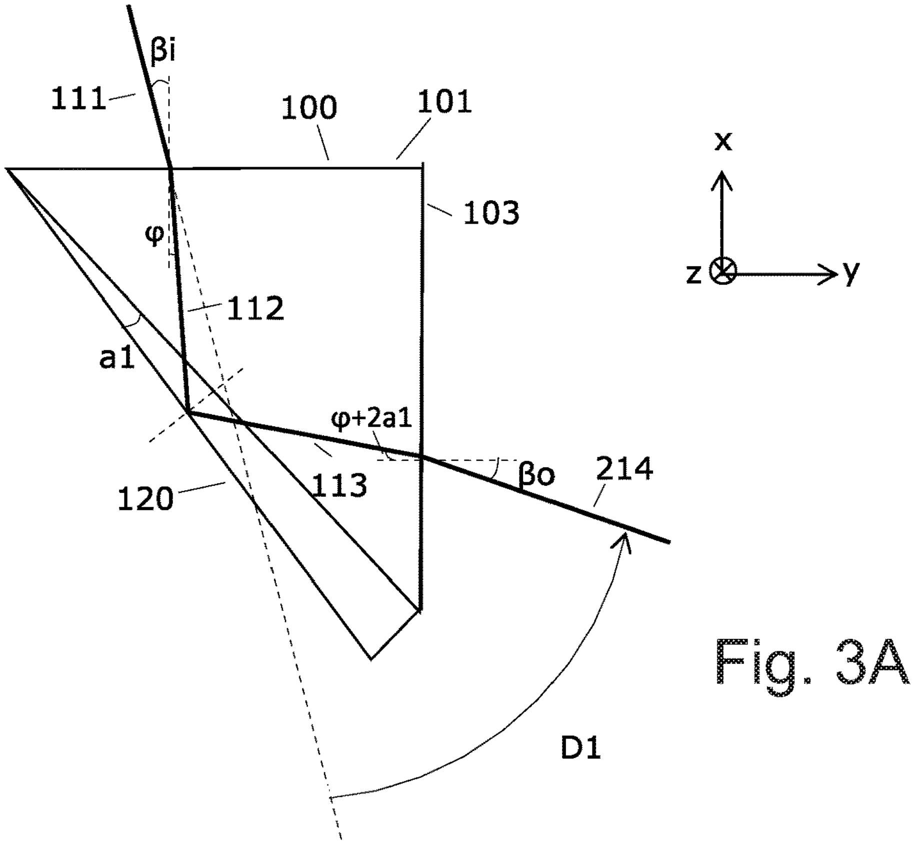
FIGS. 3A, 3B and 4 show different configuration of the variable light deflection device.

FIG. 3A shows the prism 100 in a configuration with only the reflection member 120 oriented with the first acute angle at relative to the prism.

Based on the angles shown in FIG. 3A and laws of reflection the first propagation deviation angle D1 can be determined as:

$$D1 = (\beta i - \varphi) + \left(\frac{\pi}{2} - 2a_1\right) + (\varphi + 2a_1 - \beta o)$$

Snell's law gives the following relations at the first and third faces 101, 103:

$$\sin\beta o = n\sin(\varphi + 2a_1)$$

$$\sin\beta i = n\sin\varphi$$

From this the first deviation angle D1 can be expressed as:

$$D1 = \frac{\pi}{2} + \beta i - \sin^{-1}\left(n\sin\left(\sin^{-1}\left(\frac{\sin\beta i}{n}\right) + 2a_1\right)\right)$$

Which for small angles can be approximated as:

$$D1 \sim \frac{\pi}{2} - 2a_1 n$$

where the refractive index n in this example is the refractive index of the shape variable body 241 and the prism 100. From this it follows that the chromatic aberration in terms of the dependency of the deviation angle D1 of the refractive index n is $$\frac{dD1}{dn} = -2a_1,$$

implying that the chromatic aberration amount varies linearly with the change of the first acute angle at.

The distortion or dependency of the first deviation angle D1 of the angle of incidence pi of the incoming ray 111 can be determined from the non-approximated equation for D1, dD1/dβi. It can be verified that this gives a result that is not constant. Ideally, the derivative dD1/dβi should equal 1 or −1, i.e. an angular change of the incident ray 111 should give the same angular change of the output ray 214.

Figure 3B:
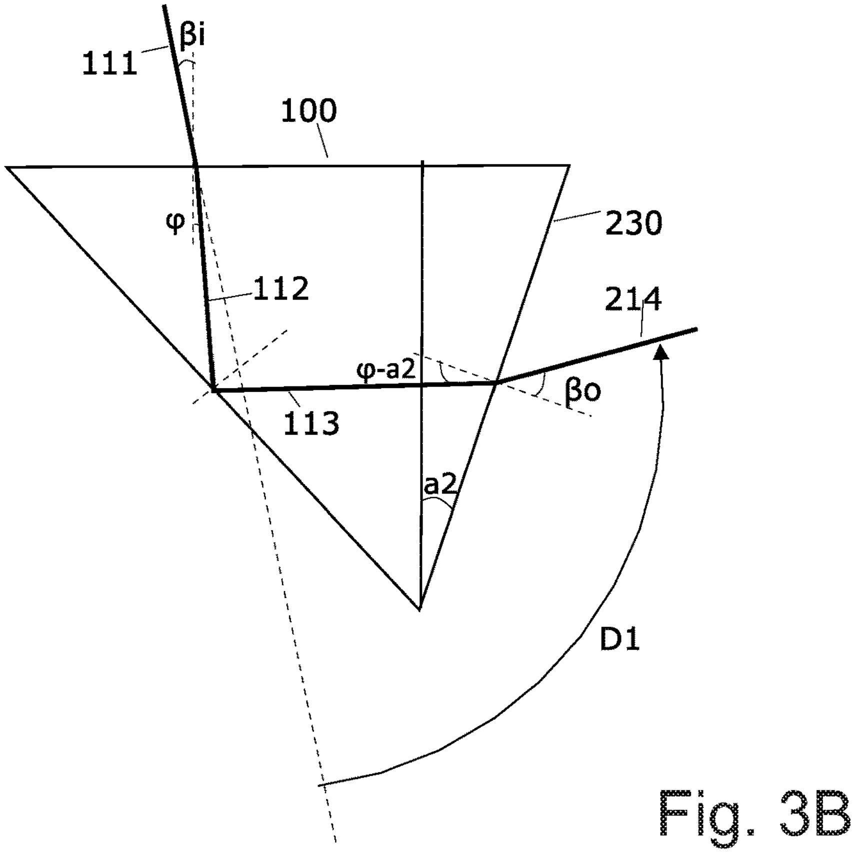

FIG. 3B shows the prism 100 in a configuration with only the refraction member 230 oriented with the second acute angle a2.

Based on the angles shown in FIG. 3*b* and laws of reflection the first propaqation deviation angle D1 can be determined as:

$$D1 = (\beta i - \varphi) + \frac{\pi}{2} + (\varphi - a_2 - \beta o)$$

Snell's law gives the following relations at the first and third faces 101, 103:

$$\sin\beta i = n\sin\varphi$$

$$\sin\beta o = n\sin(\varphi - a_2)$$

From this the first deviation angle D1 can be expressed as:

$$D1 = \frac{\pi}{2} + \beta i - a_2 - \sin^{-1}\left(n\sin\left(\sin^{-1}\left(\frac{\sin\beta i}{n}\right) - a_2\right)\right)$$

Which for small angles Pi can be approximated as:

$$D1 \sim \frac{\pi}{2} + (n-1)a2$$

From this the chromatic aberration and distortion can be determined as above:

Chromatic aberration:

$$\frac{dD1}{dn} = a_2.$$

Thus, the a chromatic aberration varies linearly with the second acute angle a2

Distortion:

$$\frac{dD1}{d\beta i} \neq 1 \text{ or } -1.$$

Again it can be verified that the distortion is not constant and not equal to 1 or −1.

Thus, the configuration in FIG. 3B also exhibits some chromatic aberration and distortion.

Figure 4:
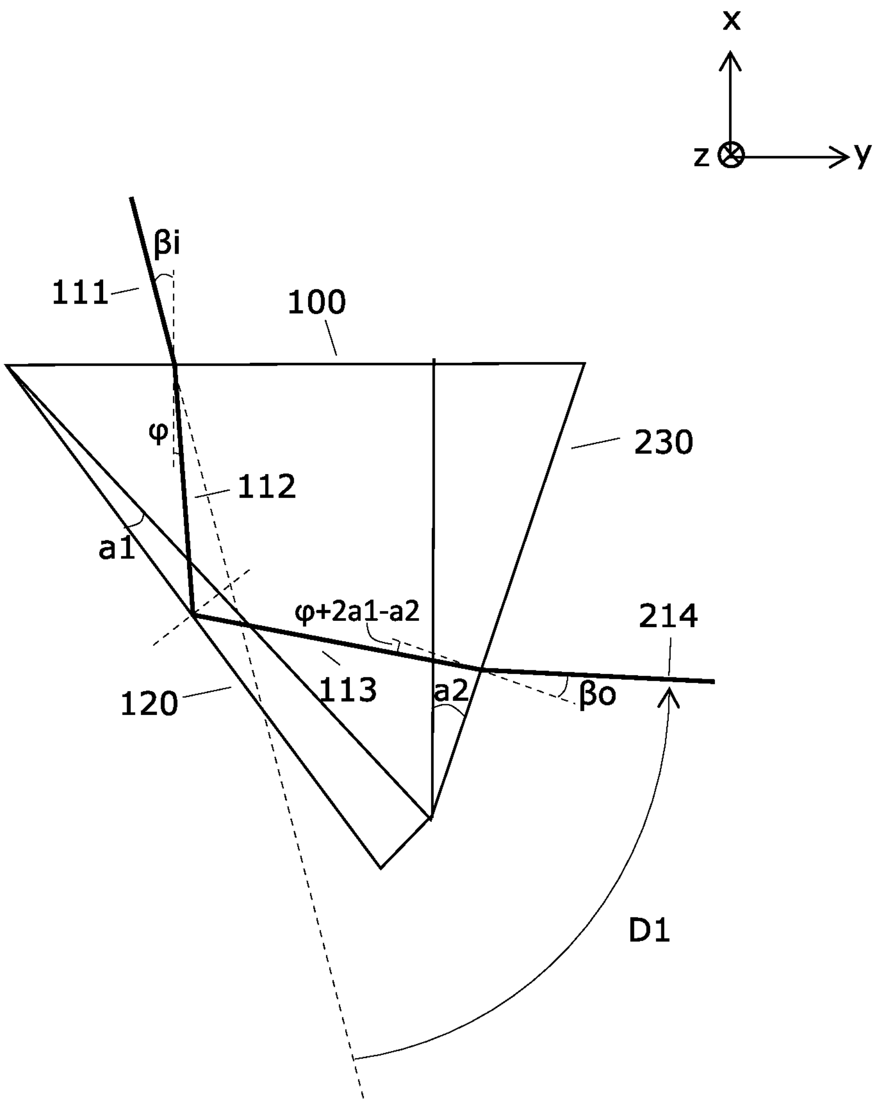

FIG. 4 shows the prism 100 in a configuration with both the reflection member 120 and the refraction member 230 with the first and second acute angles a1, a2 defined relative to respective reflection and refraction members 120, 230.

Based on the angles shown in FIG. 4 and laws of reflection the first propagation deviation angle D1 can be determined as:

$$D1 = (\beta i - \varphi) + \left(\frac{\pi}{2} - 2a_1\right) + ((\varphi + 2a_1 - a_2) - \beta o)$$

Snell's law gives the following relations at the first and third faces 101, 103:

$$\sin\beta i = n\sin\varphi$$

-continued $$\sin\beta o = n\sin(\varphi + 2a_1 - a_2)$$

From this the first deviation angle D1 can be expressed as:

$$D1 = \frac{\pi}{2} + \beta i - a_2 - \sin^{-1}\left(n\sin\left(\sin^{-1}\left(\frac{\sin\beta i}{n}\right) + 2a_1 - a_2\right)\right)$$

Which for small angles pi can be approximated as:

$$D1 \sim \frac{\pi}{2} + (n-1)a_2 - 2na_1$$

If the first and second acute angle are selected according to $a_2=2a_1=\beta i$, the first deviation angle can be simplified as:

$$D1 = \frac{\pi}{2} - \beta i.$$

From this the chromatic aberration and distortion becomes:

Chromatic aberration:

$$\frac{dD1}{dn} = 0$$

Distortion:

$$\frac{dD1}{d\beta i} = -1$$

In the examples in FIGS. 3A, 3B and 4, n is the refractive index which is the same both for the non-fluid or shape variable bodies 241, 242 and the prism 100.

According to an embodiment the prism comprises the same non-fluid material as one or more of the non-fluid bodies 251, 253, 543, so that the prism comprises the same non-fluid material as the one or more first, second and third transparent, non-fluid bodies, so that the respective the second, third, and/or fourth faces of the prism are formed in the non-fluid material. In this way, the refractive index is the same throughout the non-fluid bodies and the prism.

Accordingly, when the condition $a_2=2a_1=\beta i$ is satisfied the chromatic aberration and distortion is reduced to zero or substantially zero. Pi describes undesired changes in the incident angle, herein referred to as jitter, due to e.g. unsteady handling of the camera. Herein pi may include only the angle of incidence in the first output plane, i.e. the xy plane, or may include two components of the angle of incidence: the angle of incidence in the xy plane and the angle of incidence in the xz plane. Thus, the definition of pi depends on the context with the jitter component Δβz describing undesired rotations about the z axis causing variations in D1 in the first output plane, i.e. the xy plane and with the jitter component Δβxy describing undesired rotations about an axis in the xy plane causing variations in the second propagation deviation angle D2 in the second output plane, i.e. the yz plane.

In general, the jitter angle βi describes a deviation Δβi of the angle of incidence of the incident ray 111 relative to a reference angle of incidence, e.g. a deviation between a zero angle of incidence for an incident ray impinging a reference orientation of the prism to a non-zero angle of incidence when the same incident ray impinges a prism that is rotated due to jitter. Equivalently, the jitter angle βi describes a deviation of the orientation of the camera module 210 relative to a reference orientation.

Thus, the angle of incidence pi corresponding to a jitter angle deviation Δβi can be decomposed into a jitter component Δβz describing undesired rotations about the z axis, and into a jitter component Δβxy describing undesired rotations about an axis in the xy plane. For convenience, examples and embodiments herein may refer only to Pi, also when a specific component such as Δβz is used.

The control system of the camera module 210 may be arranged to control the first and second acute angles a1, a2 so that the ratio of their angles remains equal to two or substantially two.

According to an embodiment, the second actuator system 252 may further be arranged to tilt the refraction member 230 around an axis in the xy plane, such as the x axis, to change the propagation direction D2—such as a second propagation deviation angle D2—of the refracted output light ray 214 in a second output plane which is perpendicular to the first output plane and thereby the xy plane.

Optionally, in addition or alternative to tilting the refraction member 230 around an axis in the xy plane, the first actuator system 251 may further be arranged to tilt the reflection member 120 around an axis in the xy plane, such as the x-axis, to change the propagation direction or second propagation deviation angle D2 of the refracted output light ray 214 in said second output plane.

Accordingly, the variable light deflection device 190 may comprise a deflection means embodied by the refraction member 230 and/or the reflection member 120 which is arranged to change the propagation angle D2 of the refracted output light ray 214 in a second output plane which is perpendicular or substantially perpendicular to the first output plane. In general, the first and second output planes need not be perpendicular, but are at least non-parallel so that at least a component of the second propagation deviation angle D2 and a perpendicular component of the first propagation deviation angle D1 are defined in perpendicular output planes. For convenience, FIGS. 2, 3A-B, 4 do not show the second propagation deviation angle D2 or the second output plane. 12. In addition to being perpendicular to each other, the first and/or second output planes are perpendicular or substantially perpendicular to the third face 113.

In order to compensate unintended rotations of the electronic device 150 around the z-axis, herein referred to as z-axis jitter Δβz, the first and second acute angles a1, a2 of the reflection and refraction members 120, 230 should be adjusted by first and second acute angle variations Δa1 and Δa2 according to Δa1=Δβz/2 and Δa2=Δβz. Similarly, unintended rotations of the electronic device 150 around an axis in the xy plane, herein referred to as xy-plane jitter Δβxy, can be compensated by controlling the tilt of the refraction member 230 around an axis in the xy plane, optionally in combination with the tilt of the reflection member 120 around an axis in the xy plane.

Accordingly, the control system 199 is arranged to control the tilt provided by the first and second actuator systems 251, 252 according to a predetermined mathematical expression for the first and second acute angles at and a2, by generating tilt variations Δa1 and Δa2, dependent on the jitter angle βi. The condition $a_2=2a_1=3i$ gives the mathematical expression for the first and second acute angles at and a2 as to Δa1=Δβz/2 and Δa2=Δβz.

The condition $a_2=2a_1=3i$ specifies that a ratio between the second acute angle a2 and the first acute angle at should be controlled to be constant or substantially constant, i.e. controlled to equal two or substantially equal to two.

Figure 5:
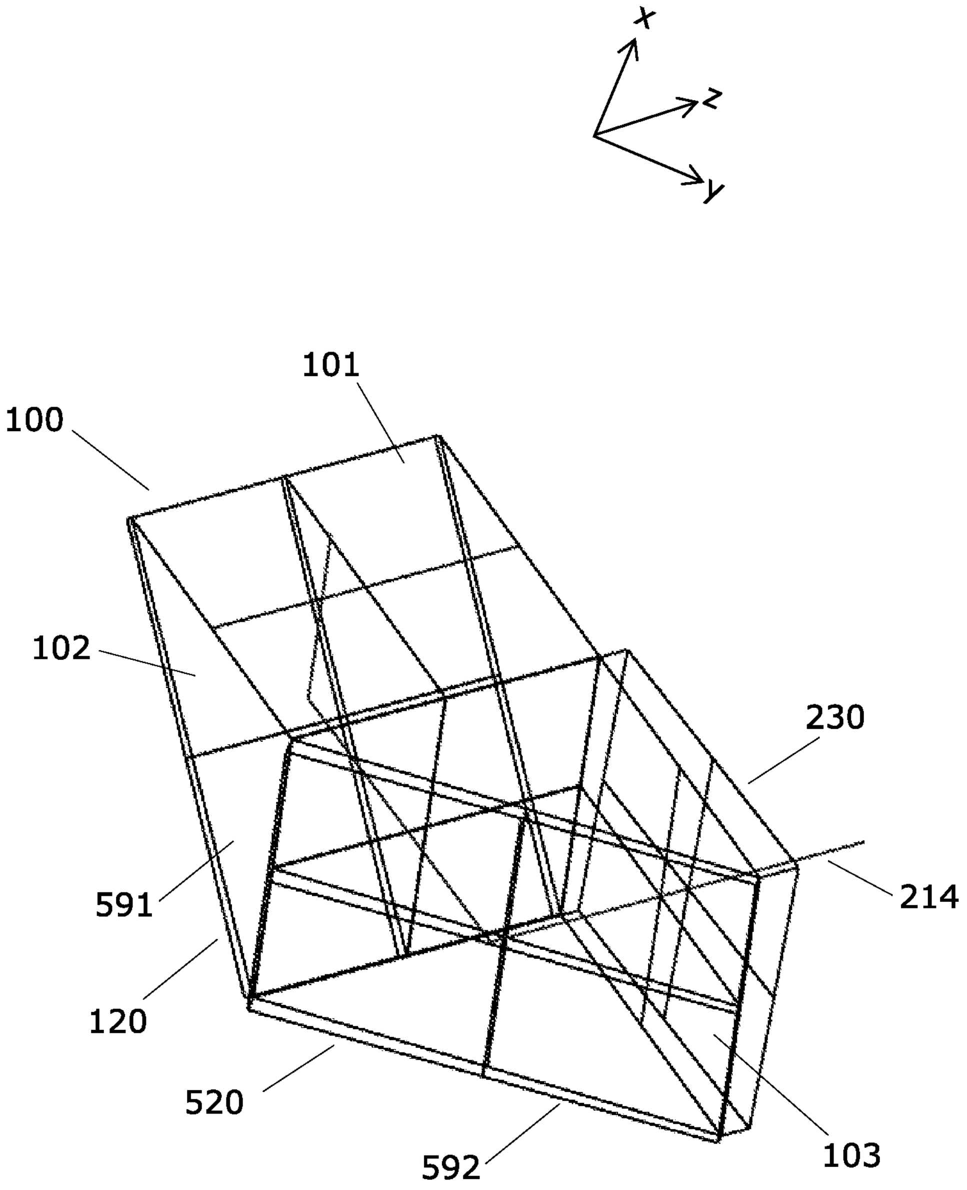
FIG. 5 shows an embodiment of the variable light deflection device wherein the prism comprises first and second connected triangular prisms such as right angled prisms.

FIG. 5 shows an embodiment of the variable light deflection device 190 wherein the prism 100 comprises first and second connected triangular prisms 591, 592 such as right angled prisms. The first and second prisms preferable have the same refractive indices and may be connected by use of a transparent adhesive. The first, second and third faces 101, 102, 103 are indicated wherein the first face is for refracting an incident light ray 111 into an incident refracted light ray 112. The first, second and third faces 101, 102, 103 are indicated as well as the reflection member 120 and the refraction member 230 arranged opposite to the second and third faces 102, 103.

Alternatively, the prims 100 in FIG. 5 may be formed monolithically.

The embodiment of FIG. 5 may comprise a further reflection member 520 arranged for deflecting the deflected light ray 113 into a further deflected light ray 113*a* to change the second propagation deviation angle D2 of the refracted output light ray 214 in the second output plane. Thus, the further reflection member 520 may embody the deflection means for deflecting the output beam 214 in the second plane. The further reflection member 520 is located between reflection member 120 and refraction member 230 with respect to the propagation of the incident light ray 111.

Figure 6:
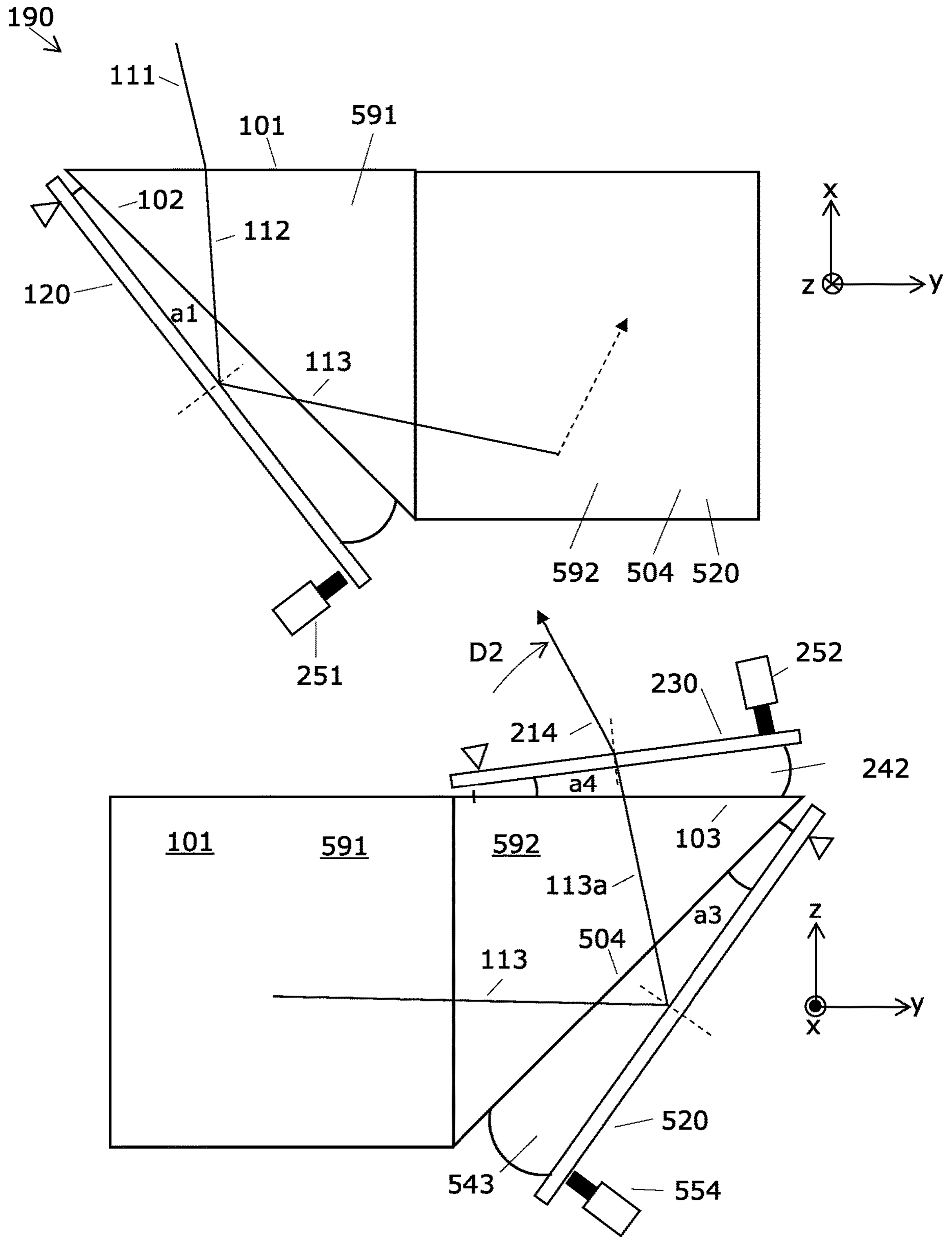
FIG. 6 shows details of the embodiment in FIG. 5.

FIG. 6 shows the embodiment of FIG. 5 in more detail, with the upper illustration showing a side view of the first and second prisms 591, 592 in the xy plane, and the lower illustration showing a side view of the first and second prisms 591, 592 in the zy plane.

The upper illustration shows the incident light ray 111 being refracted by the first face 101 to become the incident refracted light ray 112 and reflected by the reflection member 120 to become the deflected light ray 113 as in FIG. 2. The deflected light ray 113 is transmitted into the second prism 592 via the connected prism-faces.

The deflected light ray 113 may be reflected by the optional further reflection member 520 to change the second propagation deviation angle D2 as described above.

As shown in FIG. 6, the further reflection member 520 is arranged opposite to the fourth face 504 of the prism 100 so that the further deflected light ray 113*a*, is deflected in a direction perpendicular or substantially perpendicular to the deflection direction of the first deflected light ray 113. Thereby, the refraction member 230 is arranged downstream of the further reflection member 520.

A third transparent, deformable, non-fluid body 543, or in general a third shape variable body 543, is arranged between the fourth face 504 and the further reflection member 520, and a third actuator system 554 is arranged to tilt the further reflection member 520 to achieve the desired change of the second propagation deviation angle D2. The angle between the further reflection member 520 and the fourth face 504 defines the third acute angle a3.

The second acute angle a2 (not shown in FIG. 6) is defined in the xz plane and the refraction member 230 is arranged to be tilted about the y axis to change the second acute angle a2 to change the first propagation deviation angle D1 of the refracted output light ray in the first output plane, here the xz plane.

The second actuator system 252 may further be configured to tilt the refraction member 230 about the x axis to change the fourth acute angle a4 defined in the yz plane to change the second propagation deviation angle D2 of the refracted output light ray 214 in the second output plane, here the yz plane.

Accordingly, changes in the first and second acute angles at and a2 cooperates to change the first propagation deviation angle D1 of the refracted output light ray in the first output plane. Changes in the third and fourth acute angles a3 and a4 cooperates to change the second propagation deviation angle D2 of the refracted output light ray in the second output plane.

In order to compensate unintended rotations of the electronic device 150 around an axis in the xy plane, i.e. xy plane jitter Δβxy, the third and fourth acute angles a3, a4 should be adjusted by variations Δa3 and Δa4 according to Δa3=Δβxy/2 and Δa4=Δβxy.

Optionally, the reflection member 120 may further be configured to be tilted about an axis in the xy plane (such as an axis in the xy plane and parallel with the second face 102—herein referred to as the first hypotenuse rotation axis) to change the second propagation deviation angle D2 of the refracted output light ray in the second output plane. Likewise, and optionally, the further reflection member 520 may be configured to be tilted about an axis in the yz plane to change the second propagation deviation angle D1 of the refracted output light ray in the first output plane.

Figure 8:
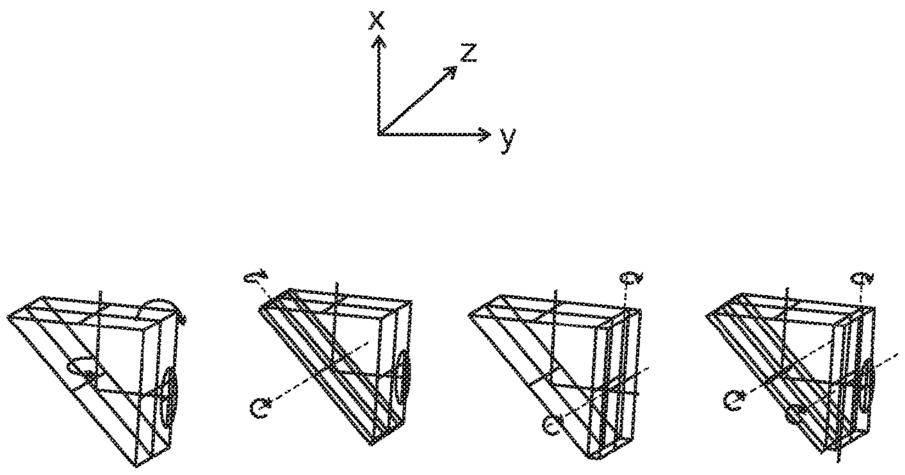
FIGS. 8-11 show tables with performance values for different configurations of the variable light deflection device.
Figure 9:
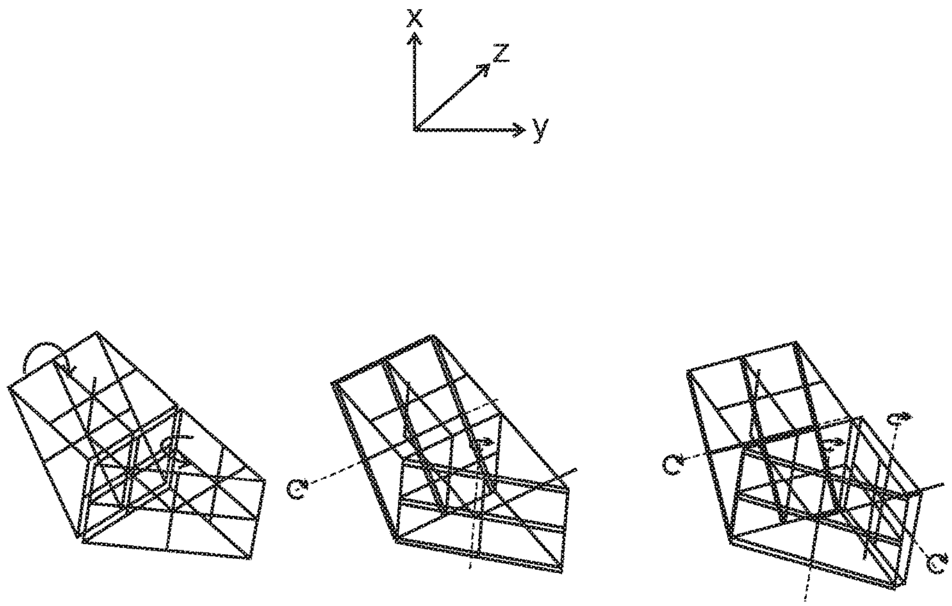
Figure 10:
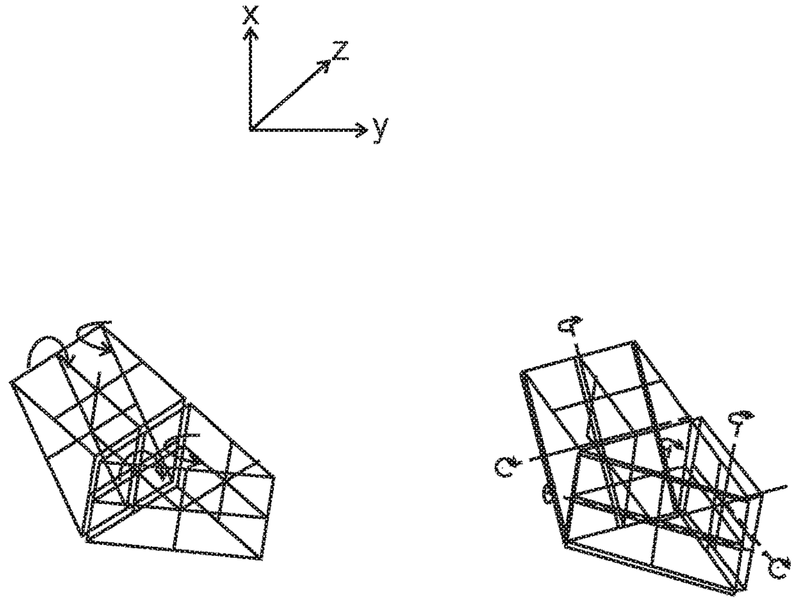

FIGS. 8, 9 and 10 show performance parameters of the different configurations of the variable light deflection device in terms of OIS accuracy, chromatic aberration, distortion, actuator stroke and image rotation of the image light rays transmitted through the light deflection device 100. The OIS accuracy is the maximum deviation of the image corrected for jitter on the image sensor 152 (e.g. expressed in μm) compared to the same image without jitter compensation.

System parameters includes an effective focal length of the imaging lens system of 15 mm, a 3.2 F-Number, a ⅓ inch sensor, and a 6 mm height (x direction) of the prism. For all cases the camera jitter angle amplitudes, i.e. camera rotations caused by the users unsteady grip of the camera, are 3° about the x and z axes.

The 2D tilted prism (FIG. 8) represents a reference case which is not part of the present invention wherein the optical image stabilization, OIS, is achieved by rotating the entire prism about two perpendicular axes such as the x axis and the first hypotenuse rotation axis. As seen the OIS accuracy is not very good.

The 2D POIS (FIG. 8) represents a case wherein only the reflection member 120 is present and where it is configured to be tilted about the z-axis and the first hypotenuse rotation axis. As seen OIS accuracy is still not very good.

The 2D Wedge (FIG. 8) represents a case wherein only the refraction member 230 in present and where it is configured to be tilted about the x- and z axes. The OIS accuracy and image rotation parameters are improved, but at the cost of chromatic aberration and increased actuator strokes.

In FIG. 8, values for the chromatic aberration is only given for the x direction, since the chromatic aberration in the z direction is low or zero.

The 1D POIS+2D Wedge (FIG. 8) represents a case corresponding to the example in FIGS. 2 and 4, but where the refraction member 230 is configured to be tilted about two perpendicular axes, here the x- and z axes. The x-tilt stroke of the refraction member 230 of 517 μm is relatively high since the refraction member 230 has to generate the required z direction compensation of the Δβz jitter. The actuator strokes are given for the present tilt axes, where h designates the hypotenuse direction tilt. The OIS accuracy is improved with 39 μm accuracy in the z direction and with zero in the x direction.

The 2×1D Tilted prism (FIG. 9) represents a case which is not part of the present invention wherein the optical image stabilization, OIS, is achieved by rotating the first prism 591 about the z axis and by rotating the second prism 592 about the x axis. As seen almost perfect results are obtained. However, rotation of solid prism bodies requires complex and large actuators systems and are therefore not suitable for a compact camera module.

The 2×1D POIS (FIG. 9) represents a case wherein the first prism 591 is provided with the reflection member 120 and the second prism 592 is provided with the further reflection member 520. Accordingly, the refraction member is not used. The reflection member 120 is only tilted about the z axis and the further reflection member 520 is only tilted about the x axis. The performance parameters are clearly improved compared to e.g. the 2D POIS solution.

The 2×1D POIS+2D Wedge (FIG. 9) represents a case corresponding to FIGS. 5 and 6 wherein the first prism 591 is provided with the reflection member 120 arranged to be tilted about the z axis and the second prism 592 is provided with the further reflection member 520 arranged to be tilted about the x axis. The second prism 592 is further provided with the refraction member 230 arranged to be tilted about the y- and z axes. With this configuration the performance parameters are almost perfect.

The 2×2D Tilted prism (FIG. 10) represents a case which is not part of the present invention wherein the optical image stabilization, OIS, is achieved by rotating the first prism 591 about the x and z axes and by rotating the second prism 592 about the x axis and about an axis in the yz plane (such as an axis in the yz plane and parallel with the fourth face 504—herein referred to as the second hypotenuse rotation axis). All performance parameters are perfect, but requires a complex and non-compact actuator system.

The 2×2D POIS+2D Wedge (FIG. 10) represents a case wherein the first prism 591 is provided with the reflection member 120 arranged to be tilted about the z axis and the first hypotenuse rotation axis and the second prism 592 is provided with the further reflection member 520 arranged to be tilted about the x axis and second hypotenuse rotation axis. The second prism 592 is provided with the refraction member 230 arranged to be tilted about the y- and z axes. With this configuration the performance parameters are almost perfect with only a minor distortion.

Figure 7A:
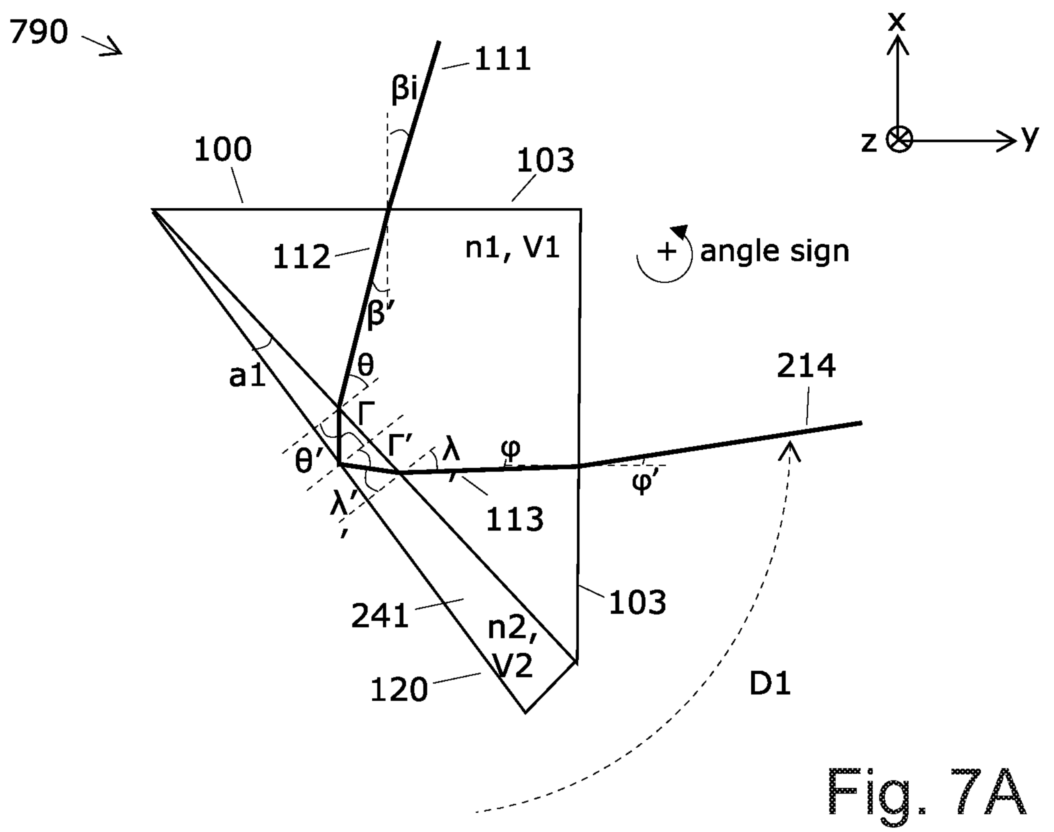
FIG. 7A shows an embodiment of the variable light deflection device providing reduced chromatic aberration.

FIG. 7A shows an embodiment 790 of the variable light deflection device 190. Similar to previous embodiments, the variable light deflection device 790 comprises the prism 100, the reflection member 120, the first transparent, deformable, non-fluid body 241 and the first actuator system 251. Similar to previous embodiments, the variable light deflection device 790 may optionally comprise one or more of the refraction member 230, the first and second prisms 591, 592 and the further reflection member 520 (these alternatives are not illustrated). The variable light deflection device 790 may be particularly advantageous for minimizing chromatic aberration.

According to this embodiment, the chromatic aberration is minimized by selecting different refractive indices n1, n2, optionally Abbe numbers V1, V2, for the prism 100 and the first transparent, deformable, non-fluid body 241, respectively, so that Abbe numbers V1, V2 of the prism 100 and the first transparent, deformable, non-fluid body 241, respectively, satisfy the condition, V2=2V1(n2−1)/(n1−1). Clearly, in practice it is almost impossible to select refractive indices n1, n2 so that the condition is completely satisfied, therefore, in practice the refractive indices n1, n2 and V1 and V2 are determined on basis of the condition so that the condition is at least partly satisfied or e.g. so that the difference V2−2V1 (n2−1)/(n1−1) is below a given threshold.

With a limited number of materials available for the prism and the non-fluid body 241, or on basis of available prisms and materials for the non-fluid body, the material and/or prisms that best satisfies the condition may be selected. The material for the non-fluid body 241 may be designed based on its composition, e.g. in combination with a selected prism, to optimize the Abbe number condition.

Alternatively, the material for the non-fluid body 241 is fixed, or there are a few available materials to choose from. When the material for the non-fluid (or fluid) material is selected, the material of the prism which meet the above condition best is selected.

By use of Snell's law of refraction and the reflection law, the follow relations are determined:

With the angle of incidence pi and assuming that the refractive index of the medium, e.g. air, wherein the incident beam 111 travels is one, the following relations can be determined:

$$\sin\beta i = n1\sin\beta'$$

$$n1\sin\theta = n2\sin\theta'$$

$$\Gamma = -\Gamma'$$

$$n2\sin\lambda = n1\sin\lambda'$$

$$n1\sin\varphi = n2\sin\varphi'$$

$$\theta = \beta' + n/4$$

$$\lambda = \theta' + a1$$

$$\lambda = \Gamma' - a1$$

$$\varphi = \gamma' + n/4$$

For a1 and βi close to zero, the equations can be simplified into:

$$\varphi' = -\beta_i - 2(2n2 - n1)a_1$$

The variations of the output angle φ' with respect to variations in the refractive indices dn1 and dn2 gives:

$$d\varphi' = \frac{\partial\varphi'}{\partial n1}dn1 + \frac{\partial\varphi'}{\partial n2}dn2 \Rightarrow \varphi' = -2a_1 dn1 - 4a_1 dn2$$

where "a/a" denotes the partial derivative and "d" denotes a variation of the relevant variable.

The condition for achromatic behavior of the prism is dφ'=0.

The Abbe numbers for the prism 100 and the first transparent, deformable, non-fluid body 241 and the prism are respectively $$V1 = \frac{(n1-1)}{dn1};\ V2 = \frac{(n2-1)}{dn2}$$

By substituting dn1 and dn2 in the expression for dφ'=0 and by using the Abbe numbers V1 and V2, zero chromatic aberration can be obtained if $$V2 = 2V1\frac{(n2-1)}{(n1-1)}$$

Accordingly, with the configuration in FIG. 7A, the chromatic aberration is minimized for any value of the angle of incidence βi when the above condition is satisfied.

Figure 7B:
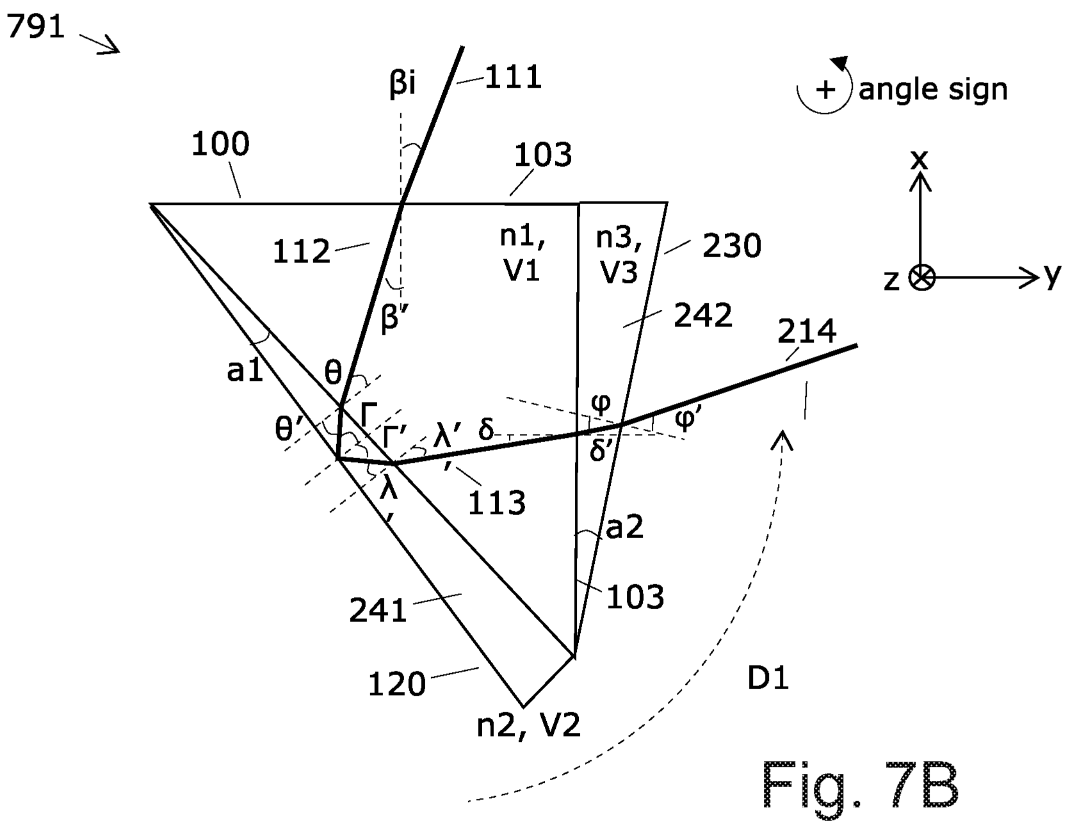
FIG. 7B shows an alternative embodiment of the variable light deflection device which different refractive indices of different components.

FIG. 7B shows an alternative embodiment 791 of the variable light deflection device 190. Similar to previous embodiments, the variable light deflection device 791 comprises the prism 100, the reflection and refraction members 120, 230, first and second transparent, deformable, non-fluid bodies 241, 242 and first and second actuator systems 251, 252 (not shown). Similar to previous embodiments, the variable light deflection device 791 may optionally comprise the first and second prisms 591, 592 and the further reflection member 520 (not illustrated).

The prism 100 has a given refractive index n1 and Abbe number V1. The first non-fluid body 241 has the refractive index n2 and Abbe number V2. The refractive index n1 and Abbe number V1 may be equal or substantially equal to the refractive index n2 and Abbe number V2, respectively, or the first non-fluid body 241 and the prism 100 may have different values for the refractive indices and Abbe numbers.

The second non-fluid body 242 has the refractive index n3 and Abbe number V3, where n3 and V3 are different from the refractive index n1 and Abbe number V1 of the prism, respectively. Alternatively, the refractive index n1 and Abbe number V1 may be equal or substantially equal to the refractive index n3 and Abbe number V3, respectively.

Thus, according to this example, in general two or all of the first and second transparent, shape variable bodies 241, 242 and the prism 100 may have different refractive indices n1, n2, n3 and different Abbe numbers V1, V2, V3.

The variable light deflection device 791 shows improved performance with respect to minimizing chromatic aberration and distortion.

According to this example, when all three components have different refractive indices and Abbe numbers, i.e. n1≠n2≠n2, V1≠V2≠V3, the chromatic aberration is minimized by determining the constant or substantially constant ratio between the second acute angle a2 and the first acute angle at according to the formula:

$$a2/a1 = 2\frac{V3}{(n3-1)}\left[2\frac{(n2-1)}{V2} - \frac{(n1-1)}{V1}\right]$$

In an example, where n1 equals or substantially equals n2 and V1 equals or substantially equals V2, but where n1≠n3 and V1≠V3, the chromatic aberration is minimized by determining the constant or substantially constant ratio between the second acute angle a2 and the first acute angle at according to the formula $$a2/a1 = 2\frac{(n1-1)}{(n3-1)}\frac{V3}{V1}$$

Thus, for given refractive indices n1, n2, n3 and Abbe numbers V1, V2, V3 of the prism 100 and the first and second non-fluid bodies 241, 242, the first and second actuator systems 251, 252 (for convenience actuators are not shown in FIG. 7B) can be controlled so that the ratio a2/a1 equals or substantially equals the condition for zero or minimized chromatic aberration, where the condition is given by the relevant expression for a2/a1.

Further, in order to compensate jitter Δβz, i.e. undesired rotations about the z axis, the predetermined mathematical expression for the first and second acute angles a1 and a2 are given by the equations:

$$a1 = \frac{-\beta i}{2\left[(2n2-n1) - V3\left[2\frac{(n2-1)}{V2} - \frac{(n1-1)}{V1}\right]\right]}$$

$$a2 = \frac{-\beta i V3\left[2\frac{(n2-1)}{V2} - \frac{(n1-1)}{V1}\right]}{(n3-1)\left[(2n2-n1) - V3\left[2\frac{(n2-1)}{V2} - \frac{(n1-1)}{V1}\right]\right]}$$

for the general case where n1≠n2≠n2 and V1≠V2≠V3 and where βi refers to the a jitter component Δβz describing undesired rotations about the z axis.

For the case where n1 equals or substantially equals n2 and V1 equals or substantially equals V2, but where n1≠n3 and V1≠V3 the equations reduces to:

$$a1 = \frac{\beta i}{2\left[(n1-1)\frac{V3}{V1} - n1\right]}$$

$$a2 = \frac{\beta i(n1-1)}{(n3-1)\left[(n1-1) - \frac{V1}{V3}n1\right]}$$

The above equations can be determined by use of Snell's law of refraction and the reflection law based on FIG. 7B:

In the general case with n1≠n2≠n3 and V1≠V2≠V3, with the angle of incidence pi and assuming that the refractive index of the surrounding medium, e.g. air, has a refractive index of one, the following relations can be determined:

$$\sin\beta i = \sin\beta'$$

$$n1\sin\theta = n2\sin\theta'$$

$$\Gamma = -\Gamma'$$

$$n2\sin\lambda = n1\sin\lambda'$$

$$n1\sin = n3\sin\delta'$$

$$n3\sin\ \varphi = \sin\varphi'$$

$$\theta = \beta' + n/4$$

$$\Gamma = \theta' + a1$$

$$\lambda = \Gamma' - a1$$

$$\delta = \lambda' + n/4$$

$$\varphi = \lambda' + a2$$

For at and βi close to zero, the equations can be simplified into:

$$\varphi' = -\beta i - 2(2n2-n1)a1 + n3a2$$

The variations of the output angle φ' with respect to variations in the refractive indices dn1, dn2 and dn3 gives:

$$d\varphi' = \frac{\partial\varphi'}{\partial n1}dn1 + \frac{\partial\varphi'}{\partial n2}dn2 + \frac{\partial\varphi'}{\partial n3}dn3 \Rightarrow d\varphi' = -4a1dn2 + 2a1dn1 + a2dn3$$

where "∂/∂" denotes the partial derivative and "d" denotes a variation of the relevant variable.

The condition for achromatic behavior of the prism device 190 is dφ'=0. The Abbe numbers for the prism 100 and the first and second transparent, deformable, non-fluid bodies 241, 242 and the prism are respectively $$V1 = \frac{(n1-1)}{dn1};\ V2 = \frac{(n2-1)}{dn2} V3 = \frac{(n3-1)}{dn3}$$

By substituting dn1, dn2 and dn3 into the expression for dφ'=0 and by using the expressions for Abbe numbers V1, V2 and V2, the condition for zero chromatic aberration becomes $$a2 = 2a1\frac{V3}{(n3-1)}\left[2\frac{(n2-1)}{V2} - \frac{(n1-1)}{V1}\right]$$

for the general case, and $$a2 = 2a1\frac{(n1-1)}{(n3-1)}\frac{V3}{V1}$$

for the case with only n1≠n3 and V1≠V3.

Therefore, the ratio of the second and first acute angles a2, at should equal or substantially equal to the constant given by the above equations.

In addition, in order to compensate jitter Δβz, the condition $$\varphi' + a2 = 0 \Rightarrow -\beta i - 2(2n2 - n1)a1 + (n3-1)a2 = 0$$

must be satisfied to ensure that the principal ray from the output of the prism and the optical axis are coincident. This condition corresponds to the condition $$\frac{dD1}{dn} = 0$$

used above.

By substituting the condition for zero chromatic aberration into the above equation, the tilt angles, i.e. the first and second acute angles a1, a2 can be determined as a function of the jitter angle βi (here βi expresses the z rotation jitter Δβz):

$$a1 = \frac{-\beta i}{2\left[(2n2-n1) - V3\left[2\frac{(n2-1)}{V2} - \frac{(n1-1)}{V1}\right]\right]}$$

-continued $$a2 = \frac{-\beta i V3\left[2\frac{(n2-1)}{V2} - \frac{(n1-1)}{V1}\right]}{(n3-1)\left[(2n2-n1) - V3\left[2\frac{(n2-1)}{V2} - \frac{(n1-1)}{V1}\right]\right]}$$

for the general case, and $$a1 = \frac{\beta i}{2\left[(n1-1)\frac{V3}{V1} - n1\right]}$$

$$a2 = \frac{\beta i(n1-1)}{(n3-1)\left[(n1-1) - \frac{V1}{V3}n1\right]}$$

for the case with only n1≠n3 and V1≠V3.

In a configuration of variable light deflection devices 791, the reflection member 120 and the refraction member 230 are configured to be tilted both about the z-axis and axes in the in the xy plane for enabling the deflection device to compensate z axis jitter Δβz and jitter about an axis in the xy plane Δβxy. In this case, in additional to the above equations for determining the first and second acute angles a1, a2 for the z axis rotations, angles a1xy and a2xy for rotations of the respective reflection and refraction members 120, 230 about an axis in the xy plane, such as axes parallel with the reflection and refraction members, can be determined for compensating the Δβxy jitter according to:

$$a1xy = \frac{-\sqrt{2}\beta_{xy}}{2\left[(2n2-n1) - V3\left[2\frac{(n2-1)}{V2} - \frac{(n1-1)}{V1}\right]\right]}$$

$$a2xy = \frac{-\beta_{xy} V3\left[2\frac{(n2-1)}{V2} - \frac{(n1-1)}{V1}\right]}{(n3-1)\left[(2n2-n1) - V3\left[2\frac{(n2-1)}{V2} - \frac{(n1-1)}{V1}\right]\right]}$$

for the the general case with n1≠n2≠n3 and V1≠V2≠V3.

Figure 11:
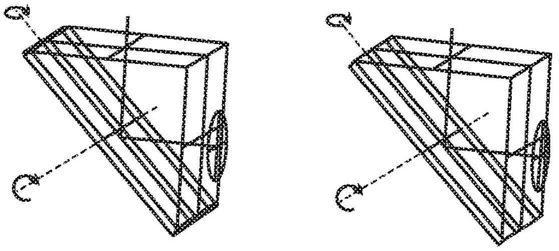

FIG. 11 shows performance parameters in the second and third columns for the variable light deflection devices 790, 791 which have been optimized according to the above conditions for obtaining zero chromatic aberration or minimum chromatic aberration. The achromatic variable light deflection devices 790, 791 are compared with the 2D POIS of FIG. 8 (in first column).

System parameters and camera jitter angle amplitudes for the two cases in FIG. 11 are the same as in FIGS. 8-10.

The other aberration parameters in the table in FIG. 11 are similar for the 2D POIS case and the Achromatic 2D-POIS case.

The achromatic optimized solution can be combined with any other embodiments of the light deflection device 190, e.g. different configurations shown in FIGS. 8-10 and described in connection with FIGS. 2-6 to achieve an achromatic optimized solution.

Figure 12A:
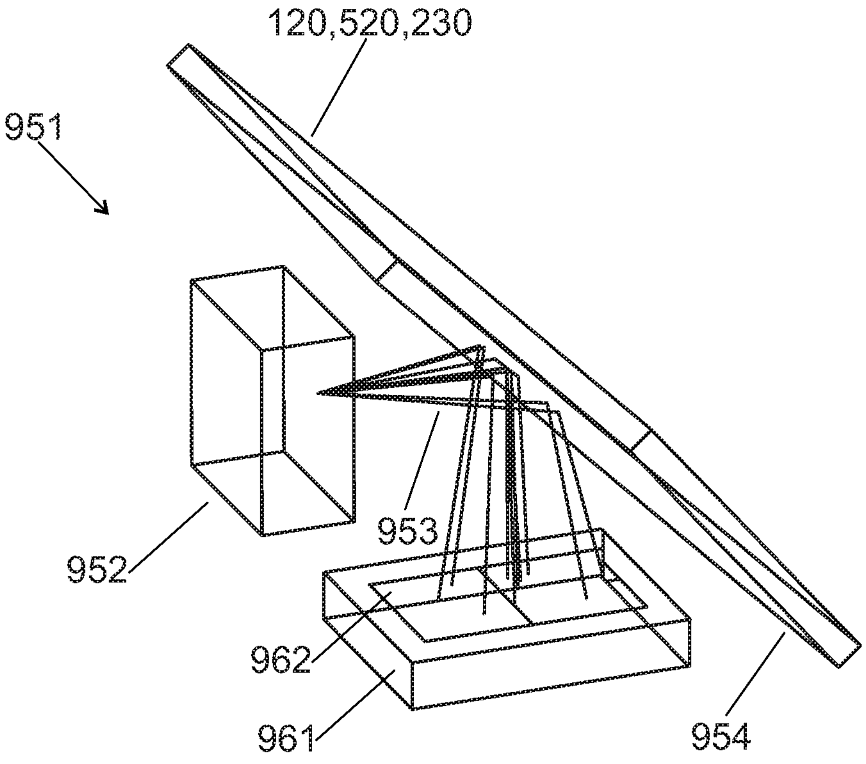
FIGS. 12A and 12B show a tilt sensors which may be comprised by the variable light deflection device.

FIG. 12A shows a tilt sensor 951, which may be comprised by the variable light deflection device 190, 790. The tilt sensor is arranged to measure the tilt of any of the reflection member 120, the further reflection member 520 and the refraction member 230.

The tilt sensor 951 comprises a light source 952 arranged to transmit a light beam 953, such as a divergent light beam, towards the back side 954 of any of the reflection members 120, 520 and the refraction member 230. The beam 953 is reflected by the back side 954 and, therefore, the propagation direction of the beam 953 is affected by the tilt of the reflection or refraction member 120, 520, 230.

By the back side 954 is meant the side which faces away from the prism 100, 591, 592. The back side 954 may be coated to provide reflection properties.

The tilt sensor 951 further comprises a light detector 961 arranged to measure a change of the light beam 953 caused by the tilt. The change of the light beam 953 may involve a change of the position of the spot of the light beam 953 on the light detector 961 and/or a change of the size of the spot of the light beam 953 on the light detector 961.

For example, the light detector 961 may be configured with at least four individual light detectors 962, where each of the individual light detectors 962 are capable of generating an output signal which is correlated with the power of the light impinging the individual light detector. By processing signal outputs from the individual light detectors 962, such as by comparing the individual outputs, changes in the tilt of the reflection or refraction member can be determined. The measured tilt can be used in the control of the actuator systems 251, 252 such as in a feed-back control system where the difference between the measured tilt and the desired tilt angle are minimized.

Figure 12B:
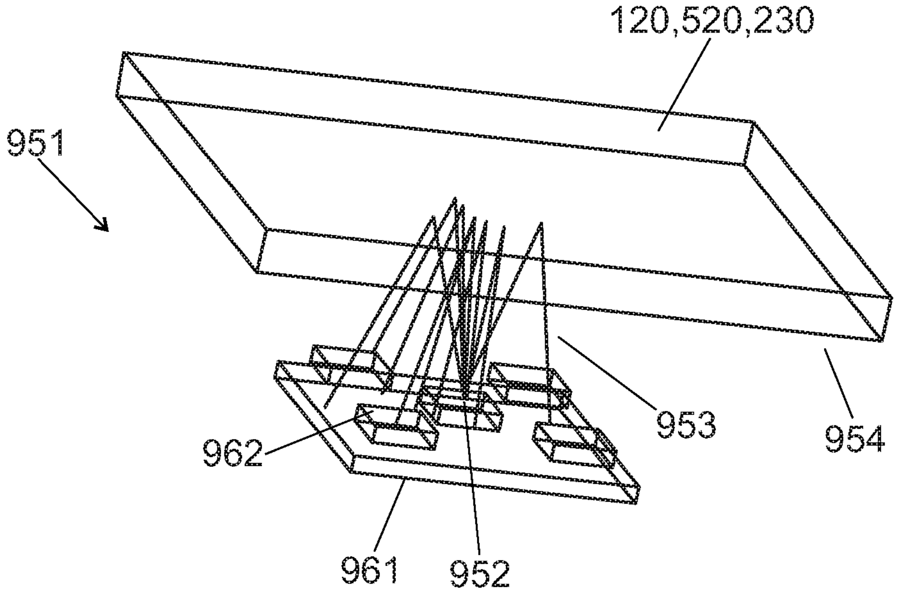

FIG. 12B shows an alternative embodiment where the light source 952 is arranged at a center of the individual light detectors 962, i.e. so that all light detectors 962 surrounds the light source 952. In this configuration the plane of the light source 952 and light detectors 962 may be parallel or substantially parallel with the back side of the reflection or refraction member.

The invention claimed is:

1. A variable light deflection device, comprising:

a prism with at least first, second and third faces, wherein the first face is configured to refract an incident light ray into an incident refracted light ray, a reflection member arranged opposite to the second face configured to deflect the incident refracted light ray back into the prism through the second face as a deflected light ray, a refraction member arranged opposite to the third face configured to refract the deflected light ray transmitted through the third face into a refracted output light ray, first and second transparent, shape variable bodies arranged between the second and third faces and the respective reflection and refraction members, first and second actuator systems where the first actuator system is arranged to tilt the reflection member to change a first propagation deviation angle of the refracted output light ray in a first output plane, and where the second actuator system is arranged to tilt the refraction member to change the first propagation deviation angle-of the refracted output light ray in said first output plane, wherein the first propagation deviation angle is an angular difference between directions of the incident ray and the output ray, wherein the reflection member is arranged with a first acute angle a1 to the second face and the refraction member is arranged with a second acute angle a2 to the third face, wherein the variable light deflection device further comprises a control system arranged to control the tilt provided by the first and second actuator systems according to a predetermined mathematical expression for the first and second acute angles, and wherein the predetermined mathematical expression specifies that a ratio between the second acute angle a2 and the first acute angle a1 is constant for different values of the first and second acute angles and wherein the predetermined mathematical expression is $$a2 = 2a1\frac{V3}{(n3-1)}\left[2\frac{(n2-1)}{V2} - \frac{(n1-1)}{V1}\right] \text{ or}$$

$$a1 = \frac{-\beta i2}{\left[(2n2-n1) - V3\left[2\frac{(n2-1)}{V2} - \frac{(n1-1)}{V1}\right]\right]} \text{ and}$$

$$\alpha 2 = \frac{-\beta i V3\left[2\frac{(n2-1)}{V2} - \frac{(n1-1)}{V1}\right]}{(n3-1)\left[(2n2-n1) - V3\left[2\frac{(n2-1)}{V2} - \frac{(n1-1)}{V1}\right]\right]}$$

wherein

V1 is the Abbe number and n1 is the refractive index of said prism;

V2 is the Abbe number and n2 is the refractive index of said first transparent shape variable body;

V3 is the Abbe number and n3 is the refractive index of said second transparent shape variable body;

and is a jitter angle, wherein the jitter angle is an angle of incidence of an axial chief ray at the first face, wherein the axial chief ray is an incident ray connecting an object point and a centre of an entrance pupil of an imaging system located downstream of the third face, wherein the object point, in a situation with zero jitter, is located on an optical axis in object space.

2. A variable light deflection device, comprising:

a prism with at least first, second and third faces, wherein the first face is configured to refract an incident light ray into an incident refracted light ray, a reflection member arranged opposite to the second face for deflecting the incident refracted light ray back into the prism through the second face as a deflected light ray, a first transparent, shape variable body arranged between the second faces and the reflection member, a first actuator system arranged to tilt the reflection member to change a first propagation deviation angle of the refracted output light ray in a first output plane, wherein the first transparent, shape variable body and the prism have different refractive indices n2, n1, and Abbe numbers V2, V1, respectively, and wherein the different refractive indices n2, n1 and Abbe numbers V2, V1 of the first transparent, shape variable body and the prism, respectively, are based on a condition, V2=2V1 (n2-1)/(n1-1).

3. A variable light deflection device according to claim 1, further comprising a deflection element arranged to change a second propagation deviation angle of the refracted output light ray in a second output plane being perpendicular to the first output plane, wherein the second propagation deviation angle relates to an angular difference between directions of the incident ray and the output ray.

4. A variable light deflection device according to claim 3, wherein the deflection element includes the first or the second actuator system arranged to further tilt the reflection member or the refraction member to change the second propagation deviation angle-of the refracted output light ray in the second output plane.

5. A variable light deflection device according to claim 3, wherein the deflection element includes a further reflection member configured to deflect the deflected light ray into a further deflected light ray to change the second propagation deviation angle of the refracted output light ray in the second output plane.

6. A variable light deflection device according to claim 5, wherein the prism comprises

- a fourth face, wherein the further reflection member is arranged opposite to the fourth face for deflecting the deflected light ray into a further deflected light ray, and arranged so that the refraction member is arranged for refracting the further deflected light ray,
- a third transparent, shape variable body arranged between the fourth face and the further reflection member,
- a third actuator system arranged to tilt the further reflection member to change the second propagation deviation angle of the refracted output light ray in the second output plane being perpendicular to the first output plane.

7. A variable light deflection device according to claim 1, wherein the first and second actuator systems are arranged to change the respective first acute angle a1 and/or the second acute angle a2 to achieve the change of first propagation deviation angle of the refracted output light ray in the first output plane.

8. A variable light deflection device according to claim 1, further comprising at least one tilt sensor arranged to measure the tilt of any of the reflection member, the further reflection member and the refraction member.

9. A variable light deflection device according to claim 1, wherein the first and/or the second transparent, shape variable bodies are first and second transparent, deformable, non-fluid bodies, and wherein the prism comprises a same non-fluid material as the first and second transparent, deformable, non-fluid bodies, so that at least one of the second and third faces of the prism are formed in the non-fluid material.

10. A camera module comprising the optical variable light deflection device according to claim 1, and an image sensor.

11. An electronic device comprising a camera module according to claim 10.

12. A variable light deflection device according to claim 2, wherein the first and second actuator systems are arranged to change the respective first acute angle and/or the second acute angle to achieve the change of first propagation deviation angle of the refracted output light ray in the first output plane.

13. A variable light deflection device according to claim 2, further comprising at least one tilt sensor arranged to measure the tilt of any of the reflection member, the further reflection member and the refraction member.

14. A camera module comprising the optical variable light deflection device according to claim 2, and an image sensor.

* * * * *